US012429745B2

(12) United States Patent
Sadlik et al.

(10) Patent No.: US 12,429,745 B2
(45) Date of Patent: Sep. 30, 2025

(54) CONVEX PROTRUSIONS IN TIR-BASED IMAGE DISPLAYS

(71) Applicant: WUXI CLEARINK LIMITED, Jiangsu (CN)

(72) Inventors: Bram M. Sadlik, Vancouver (CA); Lorne A. Whitehead, Vancouver (CA); Michele A. Mossman, Vancouver (CA)

(73) Assignee: WUXI CLEARINK LIMITED, Jiangsu (CN)

( * ) Notice: Subject to any disclaimer, the term of this patent is extended or adjusted under 35 U.S.C. 154(b) by 994 days.

(21) Appl. No.: 17/046,234

(22) PCT Filed: Apr. 10, 2019

(86) PCT No.: PCT/US2019/026807
§ 371 (c)(1),
(2) Date: Oct. 8, 2020

(87) PCT Pub. No.: WO2019/199985
PCT Pub. Date: Oct. 17, 2019

(65) Prior Publication Data
US 2021/0033942 A1 Feb. 4, 2021

Related U.S. Application Data

(60) Provisional application No. 62/655,281, filed on Apr. 10, 2018.

(51) Int. Cl.
*G02F 1/1677* (2019.01)
*F21V 8/00* (2006.01)
(Continued)

(52) U.S. Cl.
CPC ......... *G02F 1/1677* (2019.01); *G02B 3/0056* (2013.01); *G02B 6/0036* (2013.01);
(Continued)

(58) Field of Classification Search
CPC ........ G02F 1/1677; G02F 1/167; G02F 1/195; G02B 3/0056; G02B 6/0036;
(Continued)

(56) References Cited

U.S. PATENT DOCUMENTS

2003/0165016 A1* 9/2003 Whitehead ............ G02B 5/128
359/627
2006/0193030 A1* 8/2006 Babas .................... G02B 30/52
359/295

(Continued)

FOREIGN PATENT DOCUMENTS

CN 101160547 A 4/2008
CN 101427179 A 5/2009
(Continued)

OTHER PUBLICATIONS

Rudolf Kingslake, R. Barry Johnson, "Lens Design Fundamentals (Second Edition)", 2010, Academic Press. Second Edition, pp. 25-49 (Year: 2010).*

(Continued)

*Primary Examiner* — William R Alexander
*Assistant Examiner* — MacKenzi Waddell
(74) *Attorney, Agent, or Firm* — Maschoff Brennan

(57) ABSTRACT

Total internal reflection (TIR) based image displays comprise at least one high refractive index (>~1.5) convex protrusion interfaced with a low refractive index (<~1.5) medium. Total internal reflection of light is frustrated at this interface by movement of electrophoretically mobile particles into and out of the evanescent wave region. The size, shape and arrangement of the convex protrusions, typically in the shape of lenses, affects TIR at the interface and ultimately the brightness of the display. The brightness is a critical aspect of reflective displays. The degree of brightness determines what applications the displays may be used (Continued)

for and their ultimate acceptance by consumers. For example, high brightness displays allow for the use of color filter arrays for applications requiring color. The shape of the convex protrusions may be described by a polar coordinate system.

20 Claims, 24 Drawing Sheets

(51) Int. Cl.
 *G02B 3/00*   (2006.01)
 *G02F 1/167*  (2019.01)
 *G02F 1/19*   (2019.01)

(52) U.S. Cl.
 CPC .......... *G02B 6/0065* (2013.01); *G02F 1/167* (2013.01); *G02F 1/195* (2013.01)

(58) Field of Classification Search
 CPC .... G02B 6/0065; G02B 3/0081; G02B 3/005; G02B 30/27; G02B 30/29
 See application file for complete search history.

(56) References Cited

U.S. PATENT DOCUMENTS

| | | |
|---|---|---|
| 2010/0225999 A1 | 9/2010 | Lin et al. |
| 2011/0205616 A1 | 8/2011 | Mueller et al. |
| 2016/0139478 A1 | 5/2016 | Whitehead |
| 2016/0231475 A1* | 8/2016 | Whitehead ............... G02B 5/13 |
| 2017/0075184 A1* | 3/2017 | Low ........................ B32B 15/20 |
| 2017/0205032 A1* | 7/2017 | Dong ..................... G02B 19/00 |
| 2018/0364543 A1 | 12/2018 | Whitehead et al. |
| 2019/0049814 A1 | 2/2019 | Whitehead |
| 2019/0146300 A1 | 5/2019 | Sadlik et al. |

FOREIGN PATENT DOCUMENTS

| | | | | |
|---|---|---|---|---|
| CN | 101652709 A | | 2/2010 | |
| CN | 105940344 A | | 9/2016 | |
| CN | 106200198 A | | 12/2016 | |
| CN | 106918855 A | | 7/2017 | |
| CN | 107561628 A | | 1/2018 | |
| JP | 2016534413 A | | 11/2016 | |
| JP | 2017516145 A | | 6/2017 | |
| JP | 2018501520 A | | 1/2018 | |
| JP | 2018536202 A | | 12/2018 | |
| KR | 20180002402 A | | 1/2018 | |
| WO | WO-2012070765 A1 | * | 5/2012 | ........... G02B 6/0021 |
| WO | 2017100157 A1 | | 6/2017 | |
| WO | WO-2017147449 A1 | * | 8/2017 | ............. G02B 5/124 |
| WO | 2017189434 A1 | | 11/2017 | |
| WO | WO-2017205312 A1 | * | 11/2017 | ........... G02B 26/005 |
| WO | WO-2018145031 A1 | * | 8/2018 | ............. G02B 26/00 |

OTHER PUBLICATIONS

CN Office Action in Application No. 201980025162.1 Dated Mar. 30, 2022.
European Search Report in Application No. 19784269.3 Dated Dec. 7, 2021.
JP Office Action in Application No. 2020-555143 Dated Dec. 27, 2022.
CN Office Action in Application No. 201950025162.1 Dated Nov. 23, 2022.

* cited by examiner

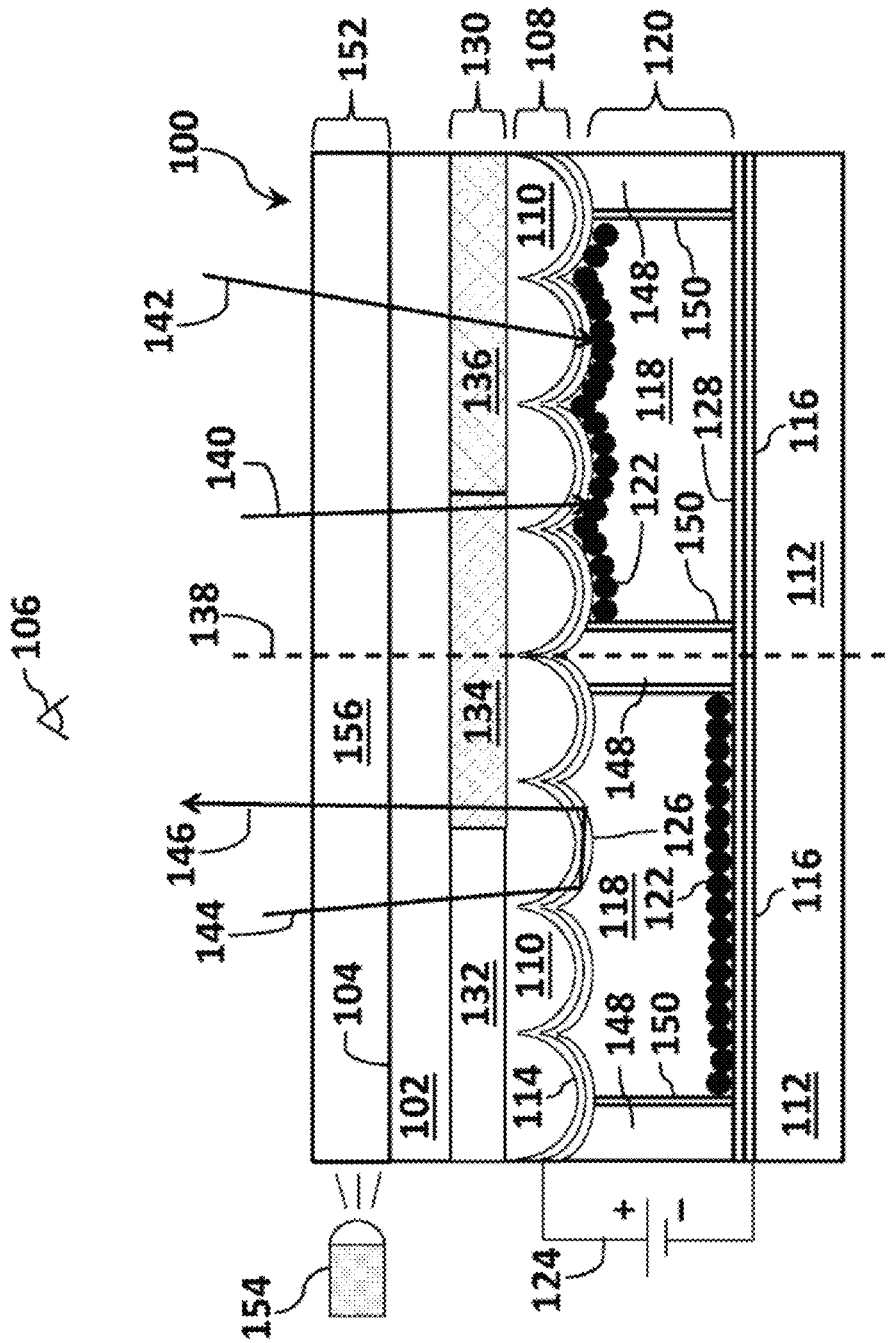

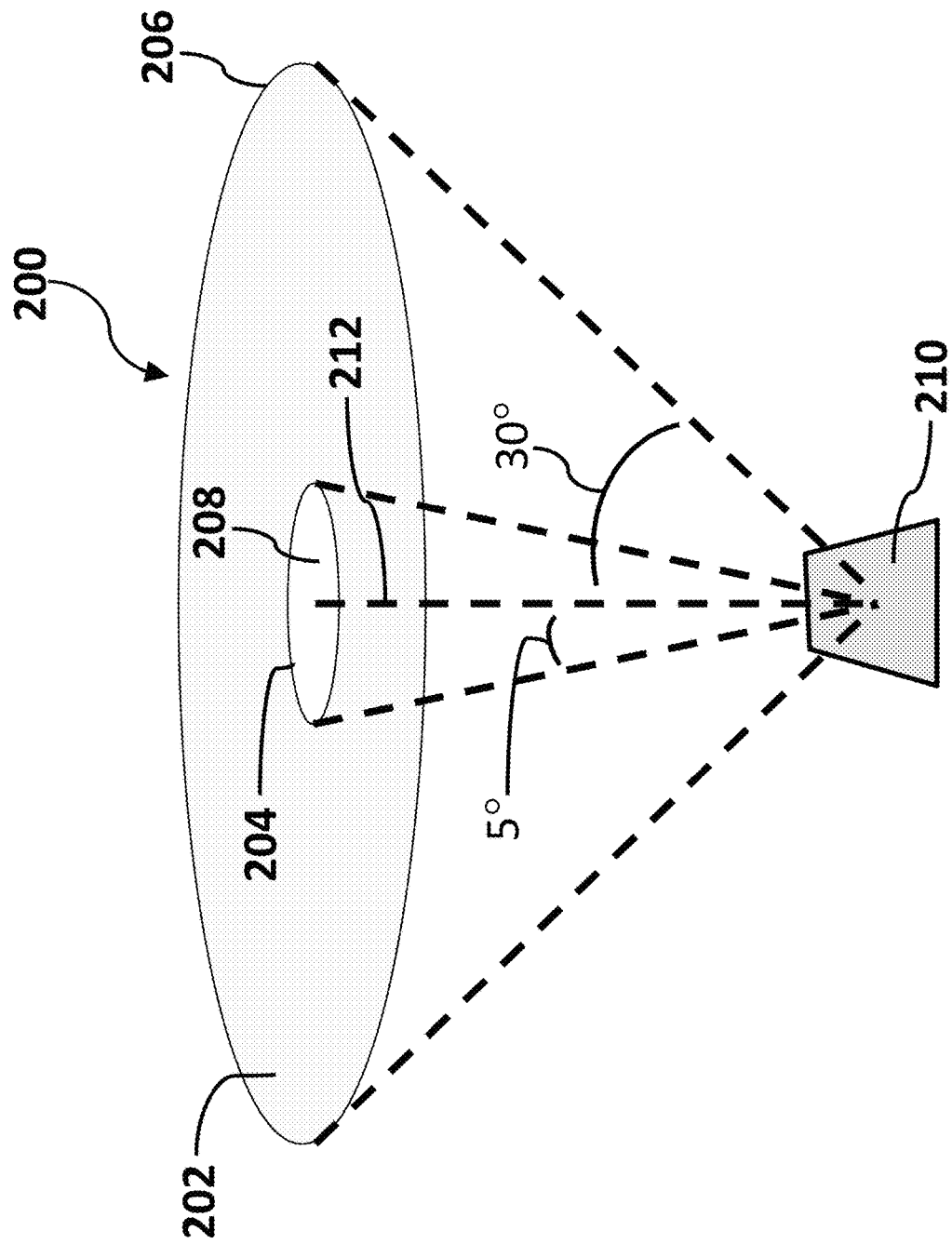

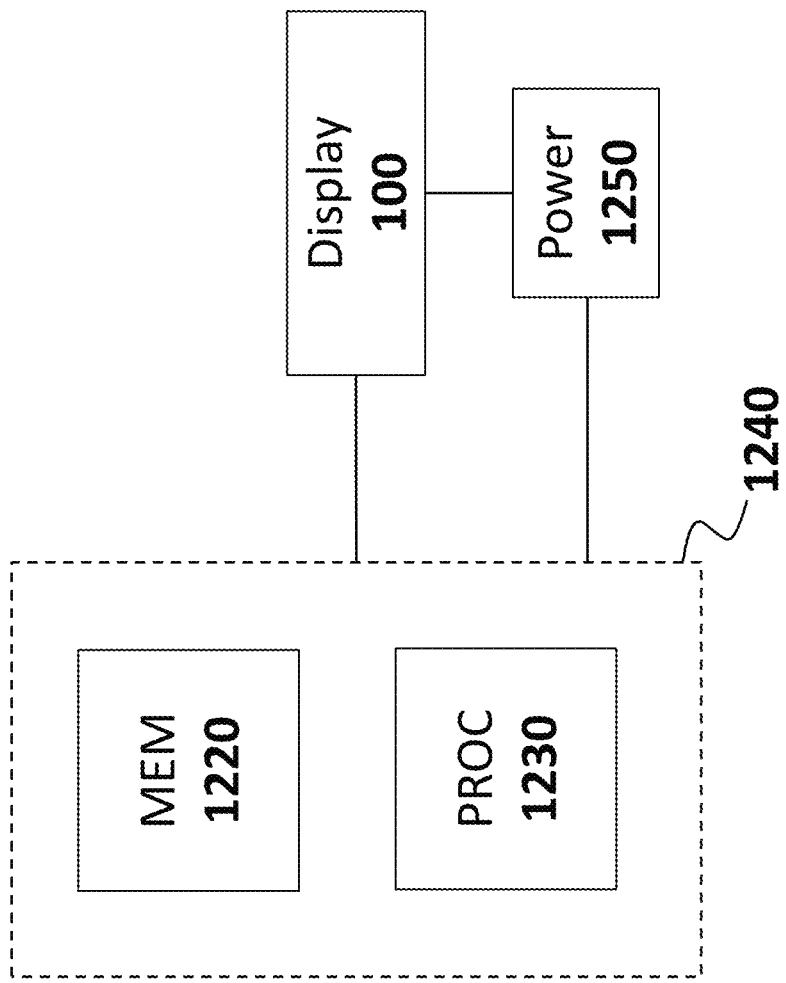

CONVEX PROTRUSIONS IN TIR-BASED IMAGE DISPLAYS

This application claims the filing date benefit of PCT Application No. PCT/US2019/026807, filed on Apr. 10, 2019 and U.S. Provisional Application No. 62/655,281, filed on Apr. 10, 2018, the entirety of which is incorporated herein by reference.

FIELD

The disclosed embodiments generally relate to total internal reflection-("TIR") based image displays. In one embodiment, the disclosure relates to a convex protrusion in a total internal reflection-based image display. In another embodiment, the disclosure relates to high refractive index convex protrusions interfaced with a low refractive index medium with dimensions configured to substantially maximize brightness.

BACKGROUND

Conventional total internal reflection (TIR) based displays include, among others, a transparent high refractive index front sheet in contact with a low refractive index fluid. The front sheet and fluid may have different refractive indices that may be characterized by a critical angle $\theta_c$. The critical angle characterizes the interface between the surface of the transparent front sheet (with refractive index $\eta_1$) and the low refractive index fluid (with refractive index $\eta_3$). Light rays incident upon the interface at angles less than $\theta_c$ may be transmitted through the interface. Light rays incident upon the interface at angles greater than $\theta_c$ may undergo TIR at the interface. A small critical angle (e.g., less than about 50°) is preferred at the TIR interface since this affords a large range of angles over which TIR may occur. It may be prudent to have a fluid medium with preferably as small a refractive index ($\eta_3$) as possible and to have a transparent front sheet composed of a material having a refractive index ($\eta_1$) preferably as large as possible. The critical angle, $\theta_c$, is calculated by the following equation (Eq. 1):

$$\theta_c = \sin^{-1}\left(\frac{\eta_3}{\eta_1}\right) \quad (1)$$

Conventional TIR-based reflective image displays further include electrophoretically mobile, light absorbing particles. The electrophoretically mobile particles move in response to a bias between two opposing electrodes. When particles are moved by a voltage bias source to the surface of the front sheet they may enter the so-call evanescent wave region where TIR may be frustrated. The depth of the evanescent wave region can be typically about 0.25 µm, though this can vary with wavelength of incident light and the refractive indices of the front sheet and medium. Incident light may be absorbed by the electrophoretically mobile particles to create a dark state observed by the viewer. Under such conditions, the display surface may appear dark or black or other color depending on the appearance of color of the particles to the viewer. When the particles are moved out of the evanescent wave region (e.g., by reverse biasing), light may be reflected by TIR. This creates a white or bright state that may be observed by the viewer. An array of pixelated electrodes may be used to drive the particles into and out of the evanescent wave region to form combinations of white and dark states. This may be used to create images or to convey information to the viewer.

The front sheet in conventional TIR-based displays typically includes a plurality of higher refractive index convex structures on the inward side facing the lower refractive index medium and electrophoretically mobile particles (i.e., the surface of the front sheet which faces away from the viewer). The convex structure can be closely packed. The convex structures may be hemispherically-shaped but other shapes may be used. A conventional TIR-based display 100 is illustrated in FIG. 1A. Display 100 is shown with a transparent front sheet 102 with outer surface 104 facing viewer 106. Display 100 further comprising a layer of a plurality 108 of convex protrusions 110, rear support sheet 112, transparent front electrode 114 on the surface of the plurality 108 of individual convex protrusions 110 and rear electrode 116. Rear electrode 116 may comprise a passive matrix array of electrodes, a thin film transistor (TFT) array or a direct drive array of electrodes. The rear array of electrodes may be formed in an array of pixels wherein each pixel may be driven by a TFT. FIG. 1A also shows low refractive index fluid 118 which is disposed within the cavity or gap 120 formed between the surface of protrusions 108 and rear support sheet 112. Fluid 118 contains a plurality of light absorbing electrophoretically mobile particles 122. Display 100 further includes a voltage bias source 124 capable of creating a bias across cavity 120. Display 100 may further comprise one or more dielectric layers 126, 128 on front electrode 114 or rear electrode 116 or on both the front and rear electrodes, and a color filter layer 130. Adding a color filter array ("CFA") layer over the front surface of the display is a conventional method to transform a black and white reflective display into a partial or full color display.

A color filter layer typically comprises one or more sub-pixel color filters. Sub-pixel color filters may comprise one or more colors of red, green, blue, white, black, clear, cyan, magenta or yellow. The sub-pixel color filters are typically grouped into two or more colors and arrayed in a repeatable pattern. The repeatable pattern makes up a pixel such as, for example, RGB (red-green-blue) sub-pixels or RGBW (red-green-blue-white) sub-pixels. For illustrative purposes, a portion of prior art display 100 in FIG. 1A comprises color filter layer 130, further comprising a red sub-pixel color filter 132, a green sub-pixel color filter 134 and a blue sub-pixel color filter 136. Other sub-pixel color filter combinations may be used.

When particles 122 are electrophoretically moved towards front electrode 114 and into the evanescent wave region, they may frustrate TIR. This is shown to the right of dotted line 138 and is illustrated by incident light rays 140 and 142 being absorbed by particles 122. This area of the display, such as at a pixel, may appear as a dark, colored or grey state to viewer 106.

When particles are moved away from front sheet 102 and out of the evanescent wave region towards rear electrode 116 (as shown to the left of dotted line 138) incident light rays may be totally internally reflected at the interface of the surface of dielectric layer 126 on convex protrusion array 108 and medium 118. This is represented by incident light ray 144, which is totally internally reflected and exits the display towards viewer 106 as reflected light ray 146. The display pixel may appear white, bright, colored or grey to the viewer.

Conventional TIR-based display 100 may further comprise sidewalls 148 that partially or fully bridge front sheet 102 to rear sheet 112. Sidewalls may comprise at least one dielectric layer 150. Display 100 may further comprise a directional front light system 152. Front light system 152 may comprise light source 154 and waveguide 156.

FIG. 1B schematically illustrates a cross-section of a portion of a TIR-based display showing the approximate location of the evanescent wave region. Drawing 180 in FIG. 1B is a close-up view of a portion of drawing 100 in FIG. 1A. The evanescent wave region is located at the interface of dielectric layer 126 and medium 118. This location is illustrated in drawing 180, wherein the evanescent wave region 182 is located between dotted line 184 and dielectric layer 126. The evanescent wave is typically conformal to the surface of layer of protrusions 108. The depth of the evanescent wave region is about 1 micron, as previously mentioned.

FIG. 1C schematically illustrates a cross-section of a transparent front sheet and a close-up view of a convex protrusion. Front sheet 102 comprises an inward array 108 of individual hemispherically-shaped protrusions 110. FIG. 1C further illustrates exploded view 186 of a single hemispherically-shaped protrusion 110. It is well known that in the center of each hemispherically-shaped protrusion is a circular region where light rays may be absorbed and do not undergo TIR. This is due to the reduced angles that the incident light rays interact with the inward surface of the hemispheres. This non-reflective region presents a problem commonly referred to as the so-called dark pupil problem, which reduces the reflectance of the display. Light rays may not be totally internally reflected and may instead pass through the display. This decreases the brightness of the display. Modifying the shape of the hemispherically-shaped protrusion may diminish the dark pupil problem. In FIG. 1C, the height of an exemplary hemispherically-shaped protrusion 110 is identified as h and the width is identified as w.

FIG. 1D schematically illustrates an overhead view of a sheet of convex protrusions. The view in FIG. 1D is a plan view of the top surface 104 of sheet 102. This is the view seen by viewer 106 in FIGS. 1A-C. Convex protrusions 110 are arranged in a layer 108 on the opposite side of sheet 102 and are depicted as dotted line circles representing hemispheres arranged into a close packed array in an exemplary manner. Other arrangements of convex protrusions 110 may be possible. Protrusions 110 may be arranged in non-close packed rows. Exploded view 190 further illustrates the width (w) of each hemispherical protrusion.

BRIEF DESCRIPTION OF DRAWINGS

These and other embodiments of the disclosure will be discussed with reference to the following exemplary and non-limiting illustrations, in which, like elements are numbered similarly, and where:

FIG. 1A schematically illustrates a cross-section of a portion of a conventional TIR-based display;

FIG. 2A schematically illustrates a 5-30 illumination geometry system;

FIG. 12 schematically illustrates an exemplary system for implementing an embodiment of the disclosure.

DETAILED DESCRIPTION

Throughout the following description specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive or exclusive, sense.

The center of a hemispherically-shaped protrusion is a circular region where light rays may be absorbed. In this region, the light rays do not undergo TIR. This is due to the reduced angles that the incident light rays interact with the inward surface of the hemispheres. This non-reflective region presents a problem commonly referred to as the dark pupil problem, which reduces the reflectance of the display. Light rays may not be totally internally reflected and may instead pass through the display which decreases the brightness of the display. According to certain disclosed embodiments, it has been determined that modifying the shape of the hemispherically-shaped protrusion can advantageously diminish the dark pupil problem.

Figure 1B:
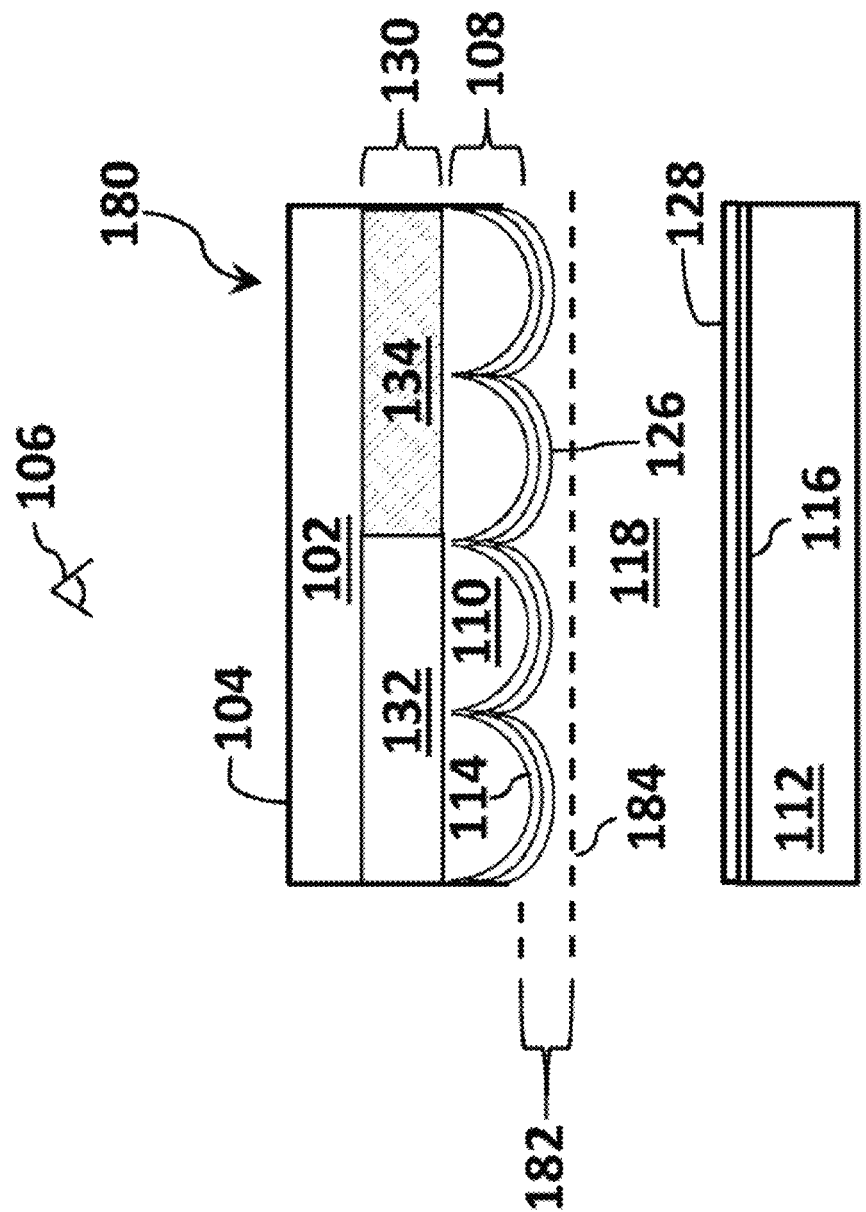
FIG. 1B schematically illustrates a cross-section of a portion of a conventional TIR-based display showing the approximate location of the evanescent wave region.
Figure 1C:
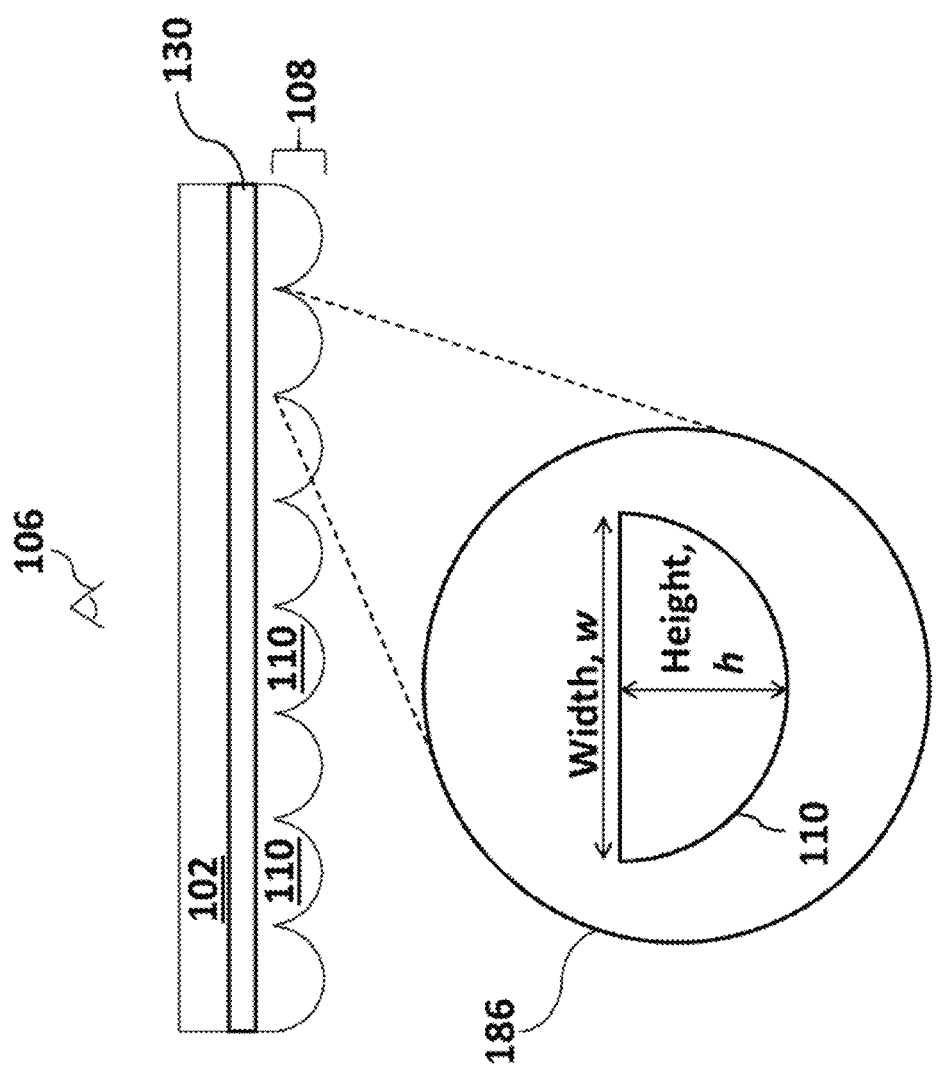
FIG. 1C schematically illustrates a cross-section of a transparent front sheet and a close-up view of a convex protrusion of a conventional TIR-based display.
Figure 1D:
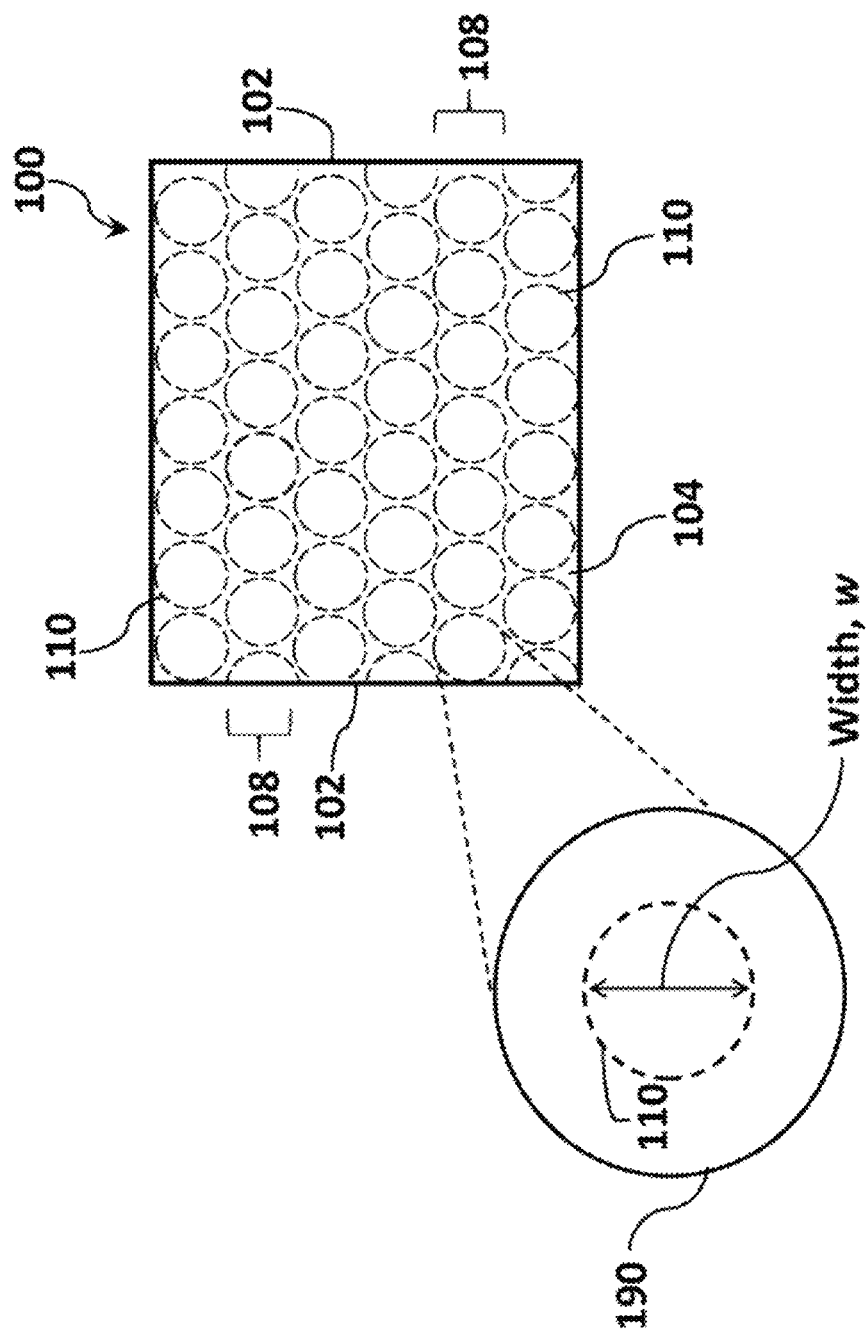
FIG. 1D schematically illustrates an overhead view of a conventional TIR-based display.

For example, a protrusion may have a shape other than hemispherical and may be characterized at least by its height (h) and width (w) as illustrated in exploded view 186 in FIG. 1C and view 190 in FIG. 1D. The height (h), width (w) and aspect ratio (h/w) of the protrusions in a TIR-based image display may be carefully controlled in order to optimize the reflectance properties of said display. The height (h), width (w) and aspect ratio (h/w) may be controlled and optimized depending on the application of the display. The shape of the convex protrusions may also be plotted using a polar coordinate system.

There are four key factors related to the shape of the structure that may affect the visual appearance: (1) The overall amount of light that is reflected, which is determined by the fraction of the total area of the observed cross-section of the structure that is occupied by the dark pupil, i.e. the ratio of the dark pupil area to the total area. This fraction may affect the overall reflectance of the surface under all lighting conditions. (2) The degree of semi-retro-reflection achieved by the structure. This may also affect the overall reflectance of the surface under many lighting conditions. (3) The degree of diffusion of reflected light. This may affect the "paper-like" appearance of the display. (4) The reflectance at different viewing angles, and the manner in which the reflectance changes as a function of viewing angle and illumination. This may also affect the "paper-like" appearance—a wide range of viewing angles and a smooth, gradual change as the viewing angle changes may be desirable. There are other factors that may affect visual appearance, for example the absorption coefficient and refractive index value of the material from which the protrusions are formed. Additionally, the packing fraction or fill factor of the protrusions in the array may affect the visual appearance. The four factors listed above are key factors that may specifically be influenced by the shape of the protrusions.

The visual appearance of an array of convex protrusions can be evaluated using a number of methods according to the disclosed embodiments. One exemplary method uses a figure of merit, or numerical expression, which quantifies the reflectance under specified illumination and viewing conditions. The preferred illumination conditions for the evaluation and the preferred figure of merit may depend on the intended application of the reflective display device. A first exemplary preferred illumination condition, which can be described as the so-called 5-30 illumination geometry, specifies that a candidate display sample is illuminated by a diffuse annular or ring light source, where the outer edge of the ring subtends a half-angle of about 30°, and the inner edge of the ring subtends a half-angle of about 5°.

FIG. 2A schematically illustrates the 5-30 illumination geometry system according to one embodiment of the disclosure. The 5-30 illumination system 200 in FIG. 2A comprises an annular ring light source 202 having an inner edge 204, an outer edge 206 and a central non-illuminated core 208. Ring light 202 is separated at a distance from sample 210. Sample 210 is arranged normal to the surface of core 208 as denoted by dotted line 212. Central non-illuminated core 208 of the annular source may serve two purposes. First, it can make it possible to position photometric measurement equipment, such as a luminance meter or spectrophotometer, without unduly blocking the illumination source. Second, when the display sample is oriented such that the surface normal of display sample 210 is aligned with the central axis 212 of annular illumination source 202, it can prevent direct front surface reflection or glare from substantially contributing to the reflectance measurements. Display sample 210 is positioned beneath source 202 and may be oriented or tilted such that the surface normal of the display sample deviates from the center of the diffuse annular source. The surface normal of the display may deviate by a first angle $\alpha$ (not shown) in one plane, and by a second angle $\beta$ (not shown) in a second, perpendicular plane. The angles $\alpha$ and $\beta$ can be described as the tilt angles.

Figure 2B:
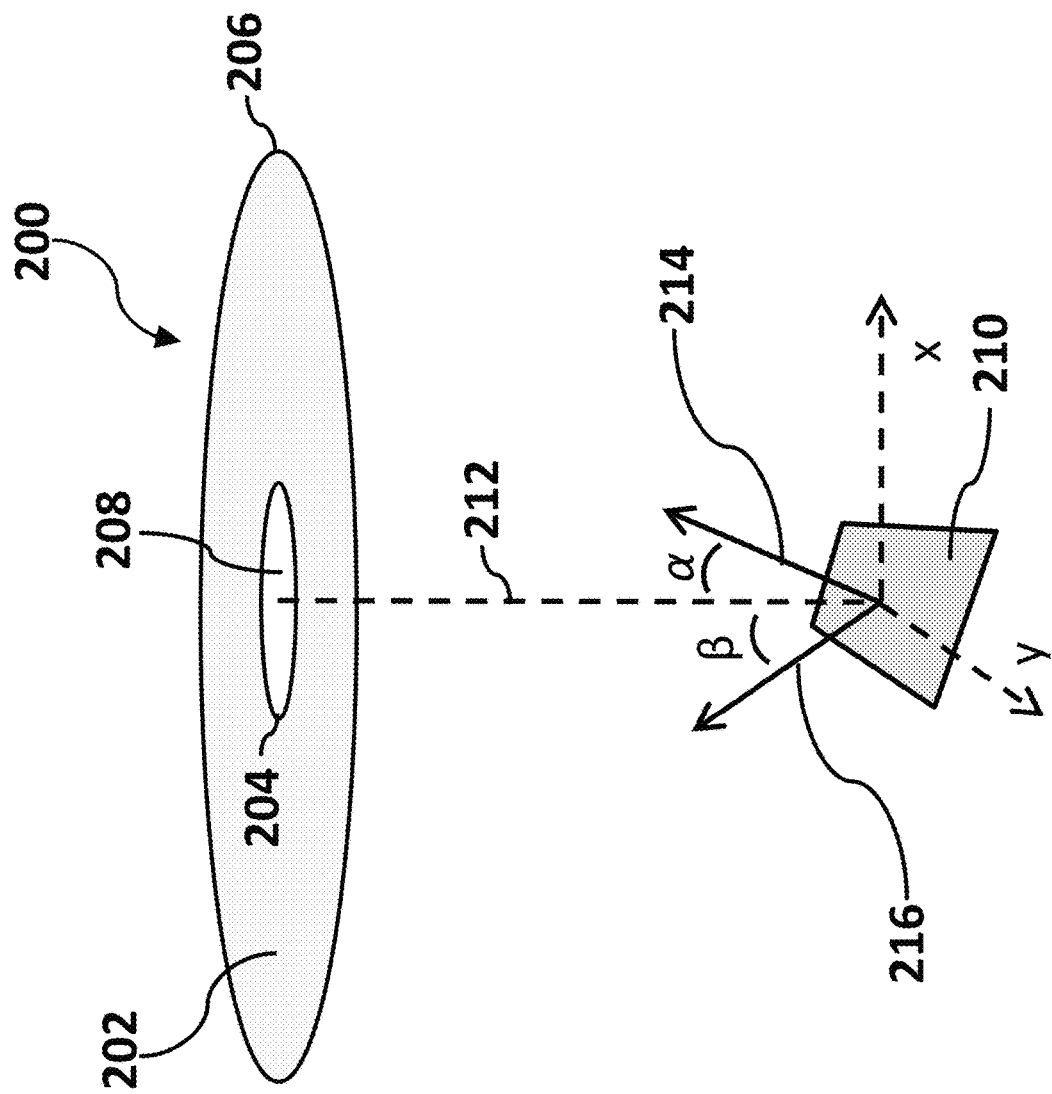
FIG. 2B illustrates how a sample may be oriented in a 5-30 illumination geometry system.

FIG. 2B illustrates how a sample may be oriented in a 5-30 illumination geometry system. Sample 210 may be tilted in the x or y direction. The x and y axes are schematically shown in FIG. 2B. Solid arrows 214, 216 denote the surface normal of display sample 210. Solid arrows 214, 216 may denote reflection path of an incoming light ray. When surface normal 214 of display sample 210 is tilted in the x direction, angle $\alpha$ relative to central axis 212 is formed and may be controlled. When surface normal 216 of display sample 210 is tilted in the y direction, angle $\beta$ relative to central axis 212 is formed and may be controlled. The $\alpha$ and $\beta$ angles are labeled in FIG. 2B. The orientation illustrated in FIG. 2A is when $\alpha=\beta=0°$.

Figure 3:
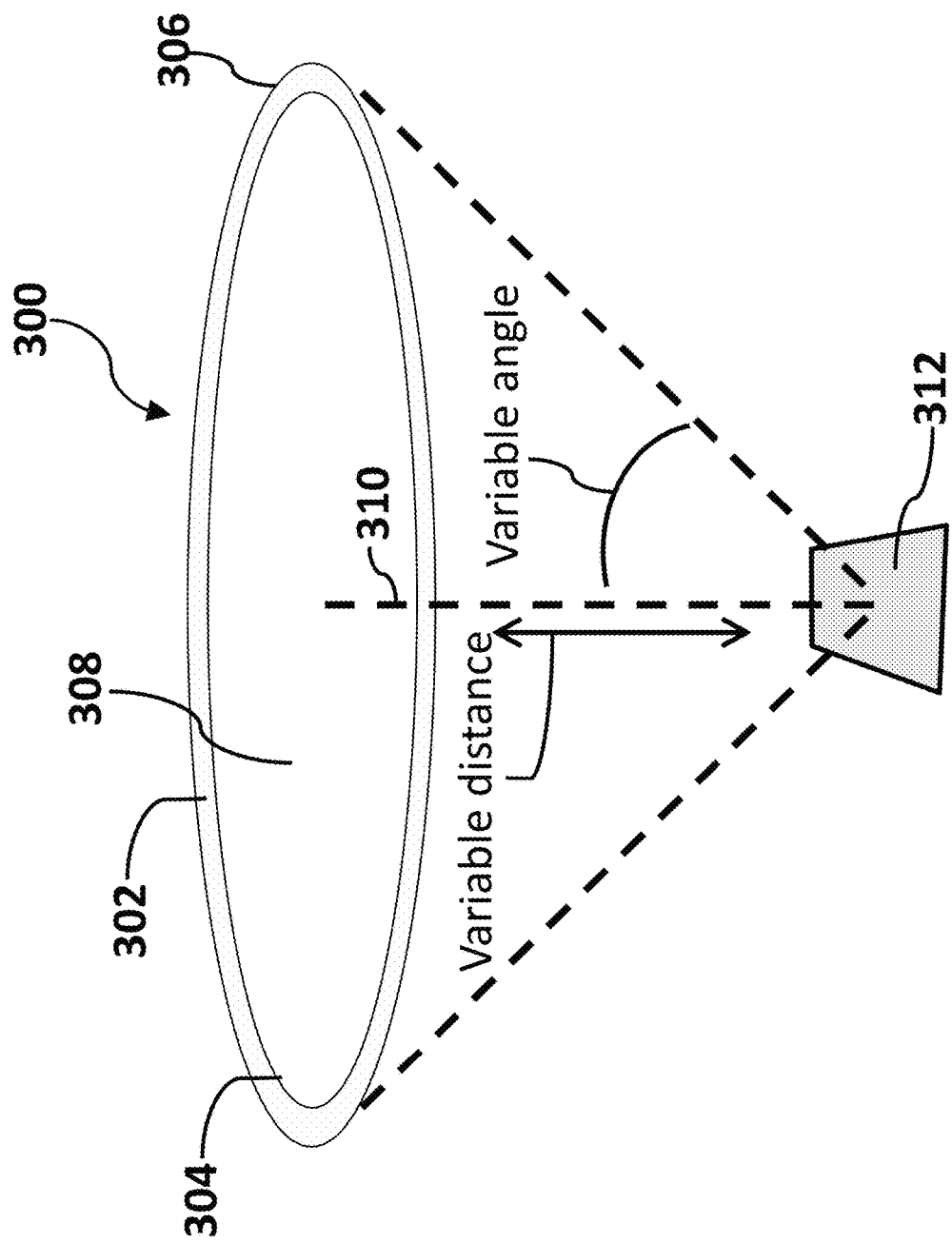
FIG. 3 illustrates a ring light illumination geometry system.

A second preferred illumination condition, which can be described as the so-called ring light illumination geometry, specifies that a candidate display sample is illuminated by a ring light with a variable illumination angle. FIG. 3 illustrates a ring light illumination geometry system according to one embodiment of the disclosure. Ring light illumination geometry system 300 comprises a ring light 302 with inner edge 304, an outer edge 306, a central non-illuminated core 308 and central axis 310 normal to the surface of ring light 302. A sample 312 may be located directly below ring light 302 with a surface perpendicular to central axis 310. Ring light 302 is a diffuse annular or ring illumination source, where the half-angle subtended by outer edge 306 the ring light 302 and the half-angle subtended by inner edge 304 of ring 302 can be varied by adjusting the radius of the source or by translating the source vertically upward or downward relative to sample 312 under test. This is labeled "variable distance" and is denoted by a double-headed arrow in FIG. 3. As the distance is varied along central axis 310 between ring light 302 and display sample 312, the angle between central axis 310 and outer edge 306 is also varied. This is labeled as variable angle in FIG. 3. In the lower end of the range, outer edge 306 of ring light 302 subtends a half-angle of about 4°. In the upper end of the range, outer edge 306 of ring light 302 subtends a half-angle of about 50°. Central non-illuminated portion 308 of ring light 302 source may serve two purposes. First, it can make it possible to position photometric measurement equipment, such as a luminance meter or spectrophotometer, without unduly blocking illumination source 302. Second, it can prevent direct front surface reflection or glare from sample 312 from substantially contributing to the reflectance measurements. Again, display sample 312 is positioned beneath light source 302 and oriented or tilted such that the surface normal of display sample 312 deviates from the center of ring light illumination source 302. The surface normal of the display may deviate by a first angle $\alpha$ in one plane, and by a second angle $\beta$ in a second, perpendicular plane similar to that which was illustrated in FIG. 2B. The angles $\alpha$ and $\beta$ can be described as the tilt angles.

The visual appearance of a candidate display sample can be evaluated by determining the reflectance of the sample under the specified illumination geometry, for example the 5-30 or ring light geometry, over a range of different $\alpha$ and $\beta$ tilt angles of the display sample, relative to a fixed viewing or measurement direction. The determination of the reflectance can be a direct measurement of a physical sample using a photometric instrument such as a luminance meter. The reflectance may also be a calculation of the reflectance by a computer modeling program using a ray trace simulation or a finite difference time domain electromagnetic energy calculation.

A figure of merit can be defined that uses the reflectance measurements described above to calculate a single value that appropriately describes the visual appearance, in terms of the four key factors (the overall amount of light reflected by TIR, the degree of semi-retro-reflection, the degree of diffusion, and the viewing angle response) that are influenced by the shape of the convex protrusions. This figure of merit can be used in order to optimize the shape of the structure to optimize overall performance and a preferred figure of merit may depend on the intended use of the reflective display device. The figure of merit should be selected such that it takes into account the desired visual performance under the anticipated illumination conditions for a particular application where the display device will be used. As an example, one preferred figure of merit may be the average value of nineteen individual reflectance values measured or calculated at the following $(\alpha,\beta)$ tilt angles ranging from 0° to 45°: (0°,0°), (0°,5°), (0°,10°), (0°,15°), (0°,20°), (0°,25°), (0°,30°), (0°,35°), (0°,40°), (0°,45°), (5°,0°), (10°,0°), (15°,0°), (20°,0°), (25°,0°), (30°,0°), (35°,0°), (40°,0°) and (45°,0°). This figure of merit calculation yields a single value that takes into account the four key visual appearance factors. The shape of the convex protrusions can be optimized to yield the best visual performance by maximizing this value. This example figure of merit is suitable for describing paper-like reflective displays where the four key visual appearance factors may be approximately equally important. Alternate figures of merit may be selected for reflective display applications requiring specific visual performance characteristics where the relative importance of the key visual appearance factors may be different.

Figure 4:
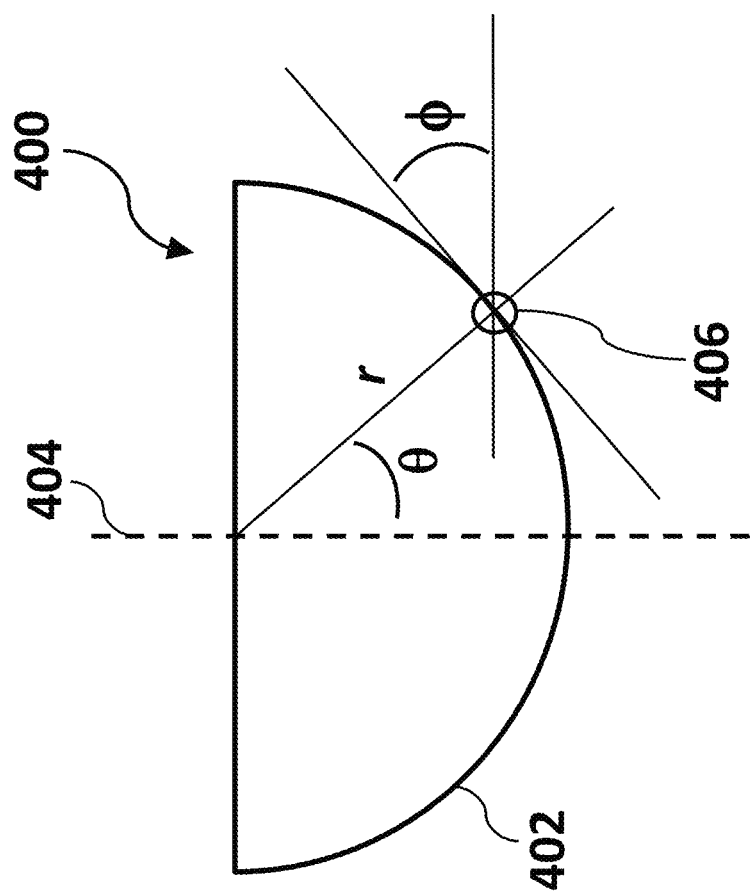
FIG. 4 illustrates a polar coordinate system using the prior art example shape of a hemisphere.

The shape of the convex protrusions may directly influence the visual appearance of the display. The shape can be described using polar coordinates. FIG. 4 illustrates a polar coordinate system using the prior art example shape of a hemisphere. The angle from vertical (vertical represented by dotted line 404) in hemisphere 402 is labeled as θ, and as θ sweeps from 0° to 90° along the outer surface of the hemisphere, the shape is defined by r (the distance between the top center of the structure and the hemisphere surface), and φ (the tangent angle at the surface wherein the tangential location is circled 406).

FIGS. 5-8 show polar coordinate plots for a number of example shapes, including: hemisphere, hemi-ellipse, hybrid convex/linear and a cosh structure. For each example, r is normalized to 1, since the overall size doesn't matter, only the shape.

This method of describing the shape in terms of a polar coordinate system can facilitate classification of the different types of shapes, particularly in terms of how φ varies as a function of θ. In particular, such classifications may be helpful if the nature of these plots enables an initial approximation of the visual appearance of a display sample incorporating convex protrusions with these shapes.

Figure 5A:
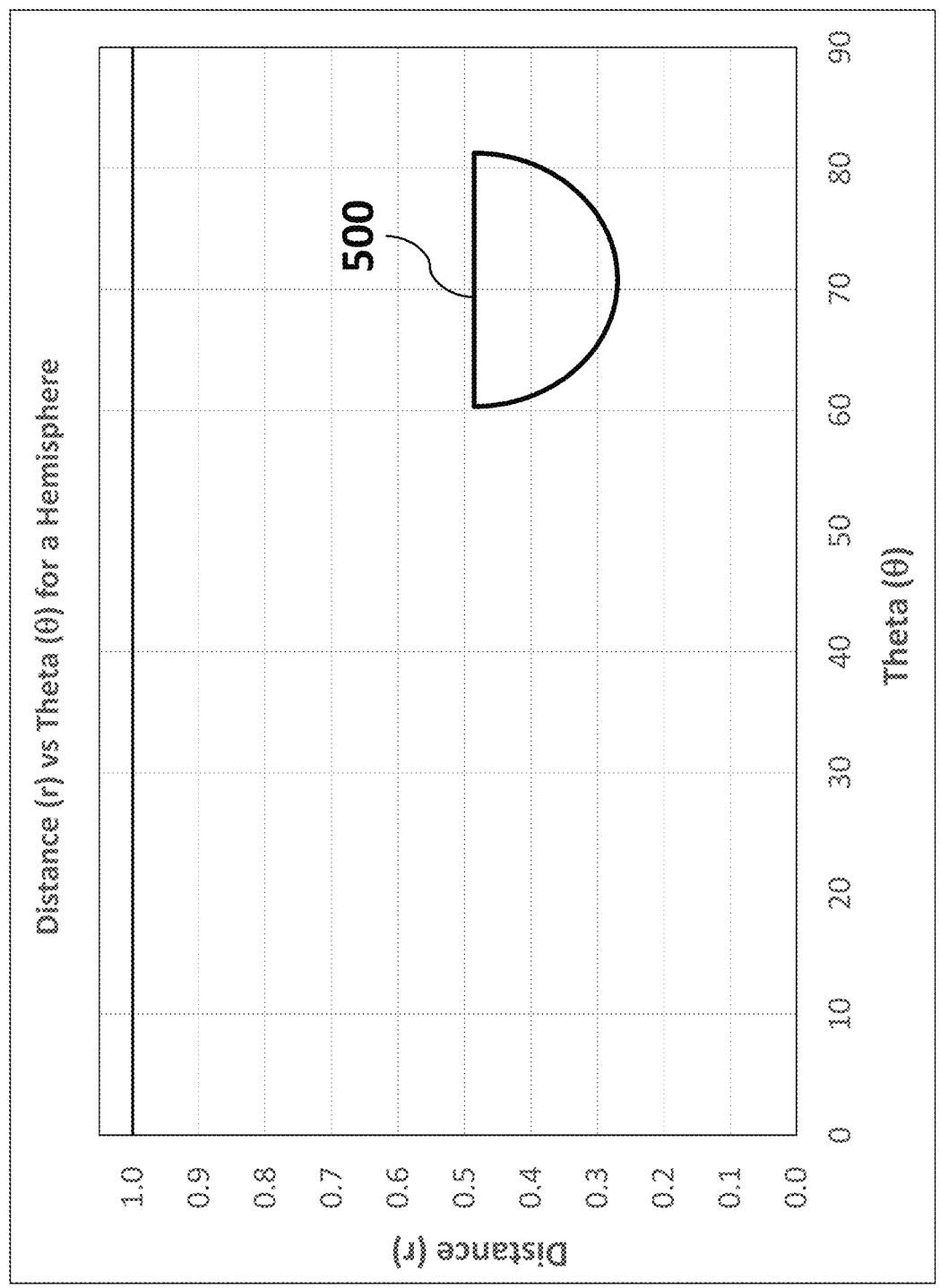
FIG. 5A graphically illustrates the surface of a hemisphere plotting distance versus theta.

FIG. 5A graphically illustrates the surface of a hemisphere plotting distance versus theta. The shape of hemisphere 500 is shown in an inset in the plot. For a hemisphere, distance r is always the same with respect to angle θ, from 0° to 90°.

Figure 5B:
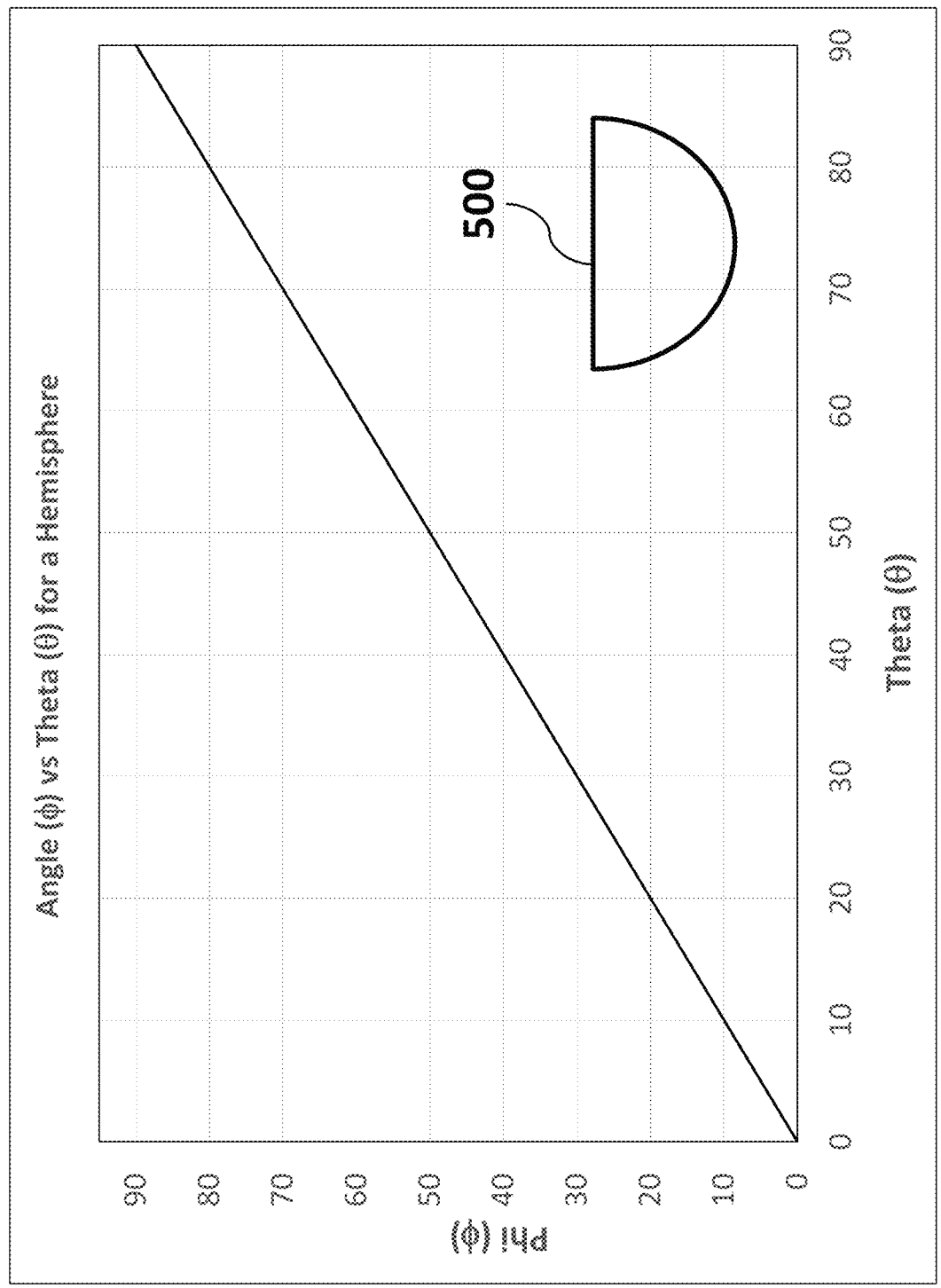
FIG. 5B graphically illustrates the surface of a hemisphere plotting tangent angle phi versus theta.

FIG. 5B graphically illustrates the surface of a hemisphere plotting tangent angle phi versus theta. The shape of hemisphere 500 is shown in an inset in the plot. For hemisphere 500, φ is always equivalent to θ, from 0° to 90°.

Figure 6A:
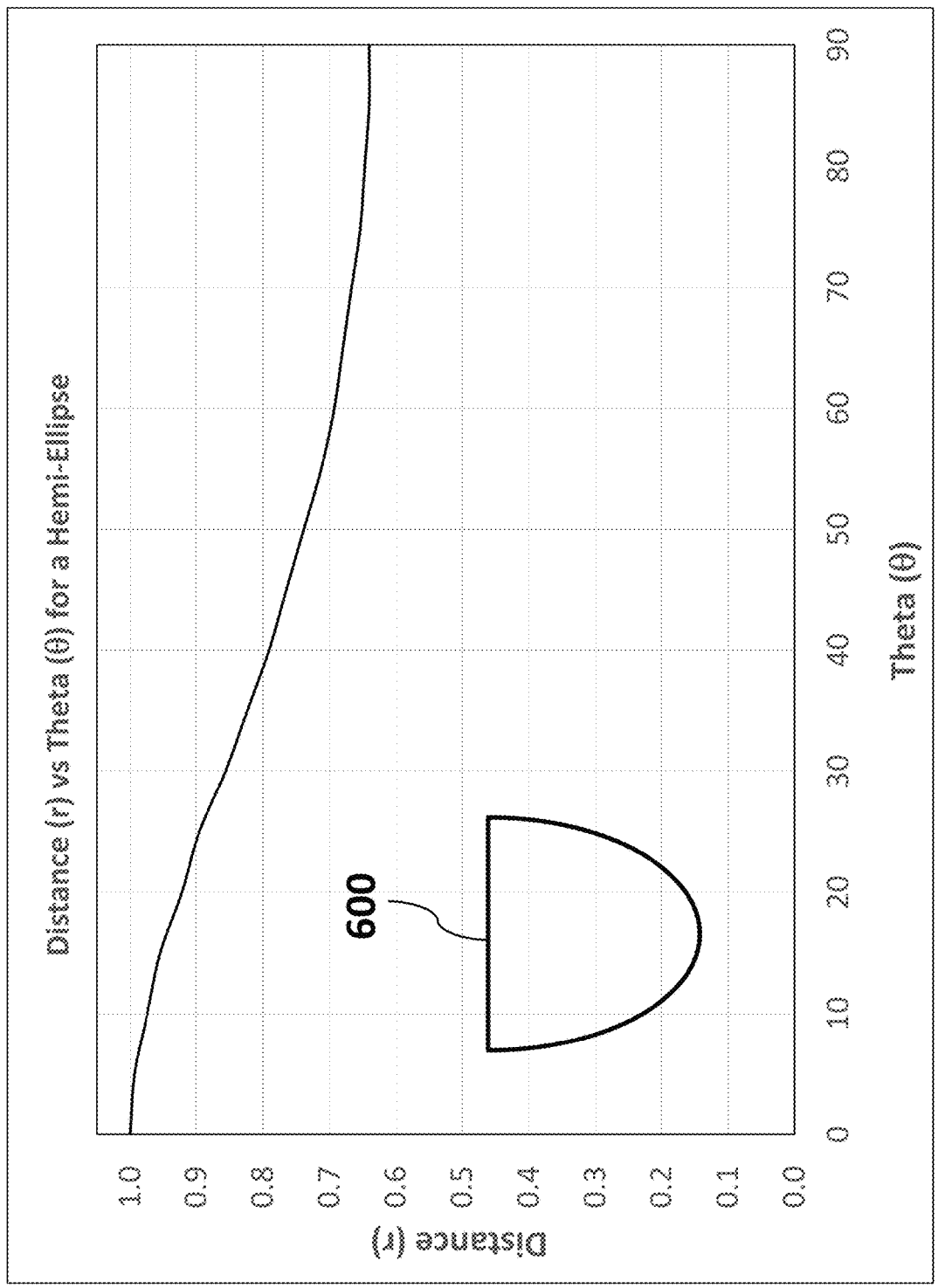
FIG. 6A graphically illustrates the surface of a hemi-ellipse plotting distance versus theta.

FIG. 6A graphically illustrates the surface of a hemi-ellipse plotting distance versus theta. The shape of the hemi-ellipse 600 is shown in an inset in the plot. For a hemi-ellipse, distance r decreases smoothly with respect to angle θ, from 0° to 90°.

Figure 6B:
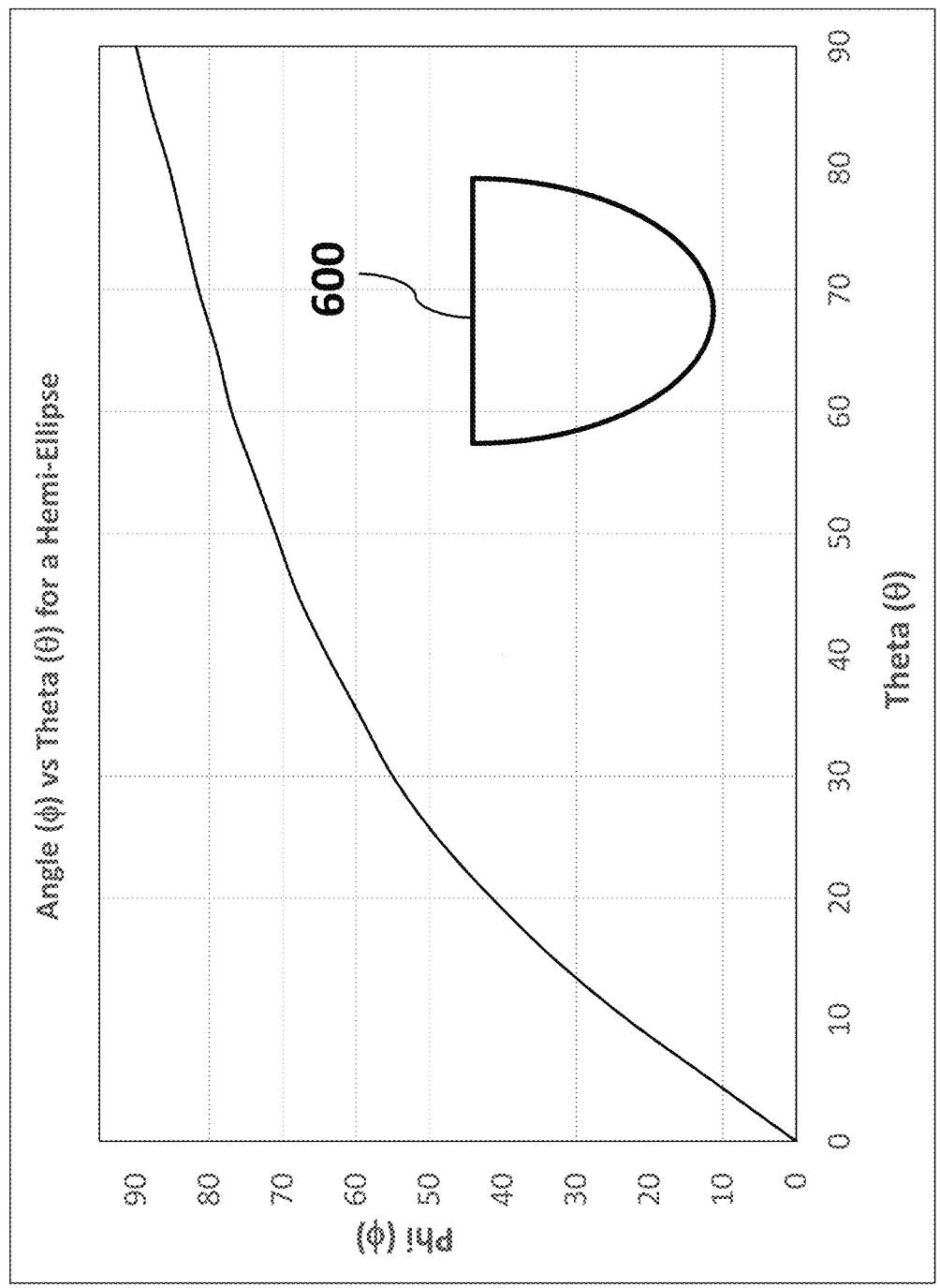
FIG. 6B graphically illustrates the surface of a hemi-ellipse plotting tangent angle phi versus theta.

FIG. 6B graphically illustrates the surface of a hemi-ellipse plotting tangent angle phi versus theta. The shape of the hemi-ellipse 600 is shown in an inset in the plot. For hemi-ellipse 600, φ increases smoothly with respect to θ, from 0° to 90°.

Figure 7A:
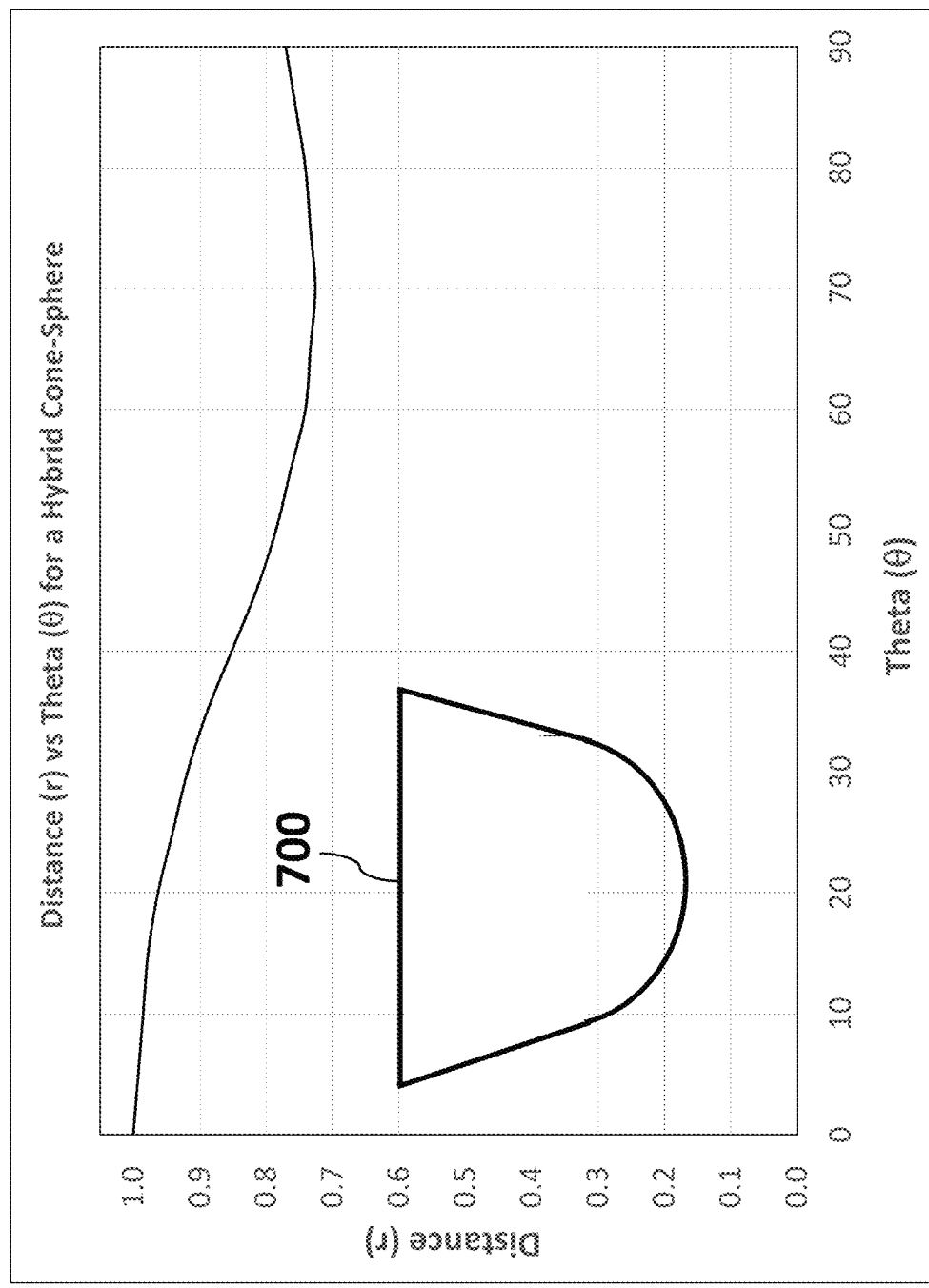
FIG. 7A graphically illustrates the surface of a hybrid cone-sphere plotting distance versus theta.

FIG. 7A graphically illustrates the surface of a hybrid cone-sphere plotting distance versus theta. The shape of the hybrid cone-sphere 700 is shown in an inset in the plot. For a hybrid cone-sphere, distance r varies with respect to angle θ, from 0° to 90°.

Figure 7B:
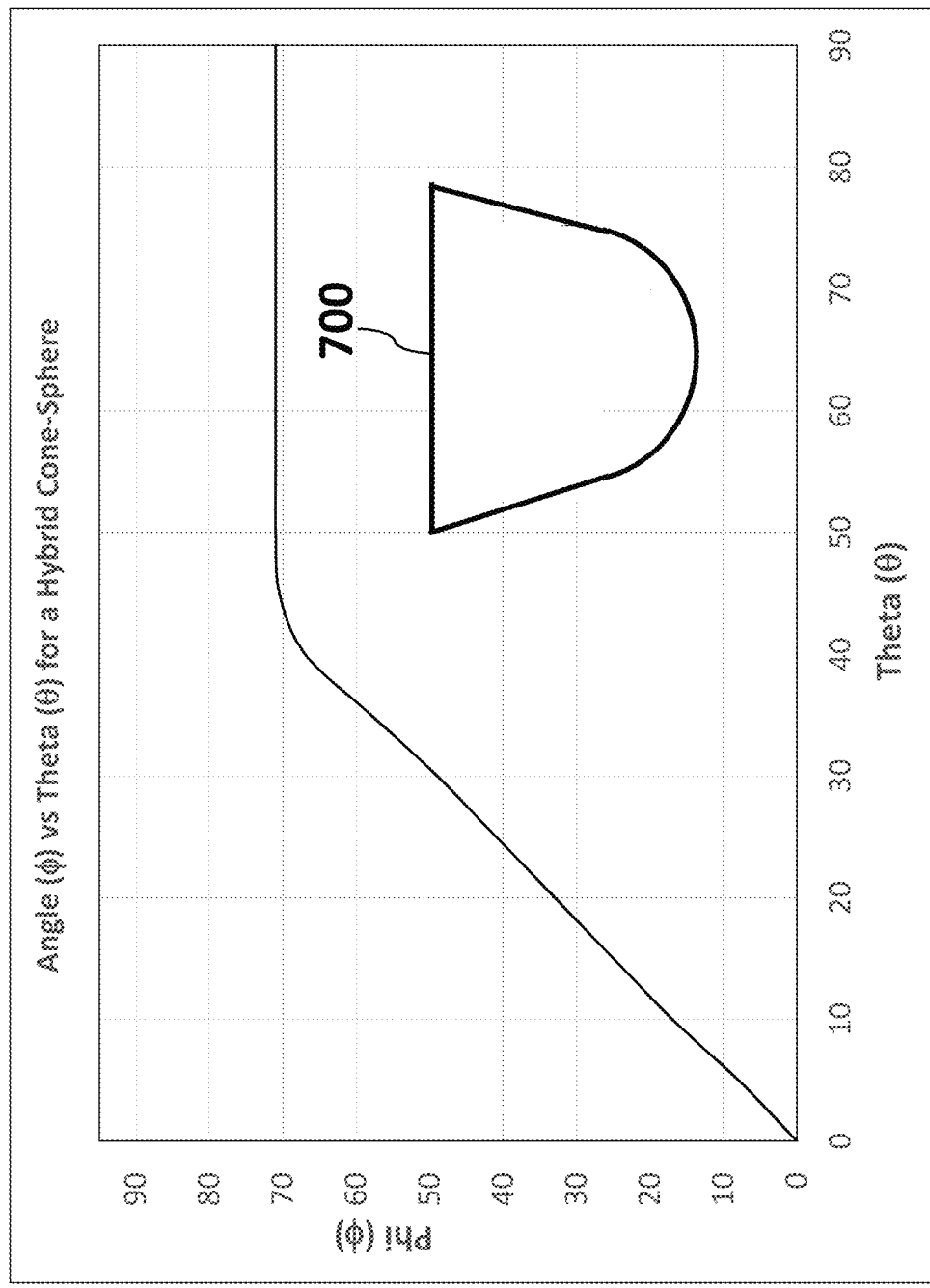
FIG. 7B graphically illustrates the surface of a hybrid cone-sphere plotting tangent angle phi versus theta.

FIG. 7B graphically illustrates the surface of a hybrid cone-sphere plotting tangent angle phi versus theta. The shape of the hybrid cone-sphere 700 is shown in an inset in the plot. For hybrid cone-sphere 700, φ increases linearly with respect to θ, from 0° to about 45° for the convex portion then remains constant after the transition to 90° for the linear section.

Figure 8A:
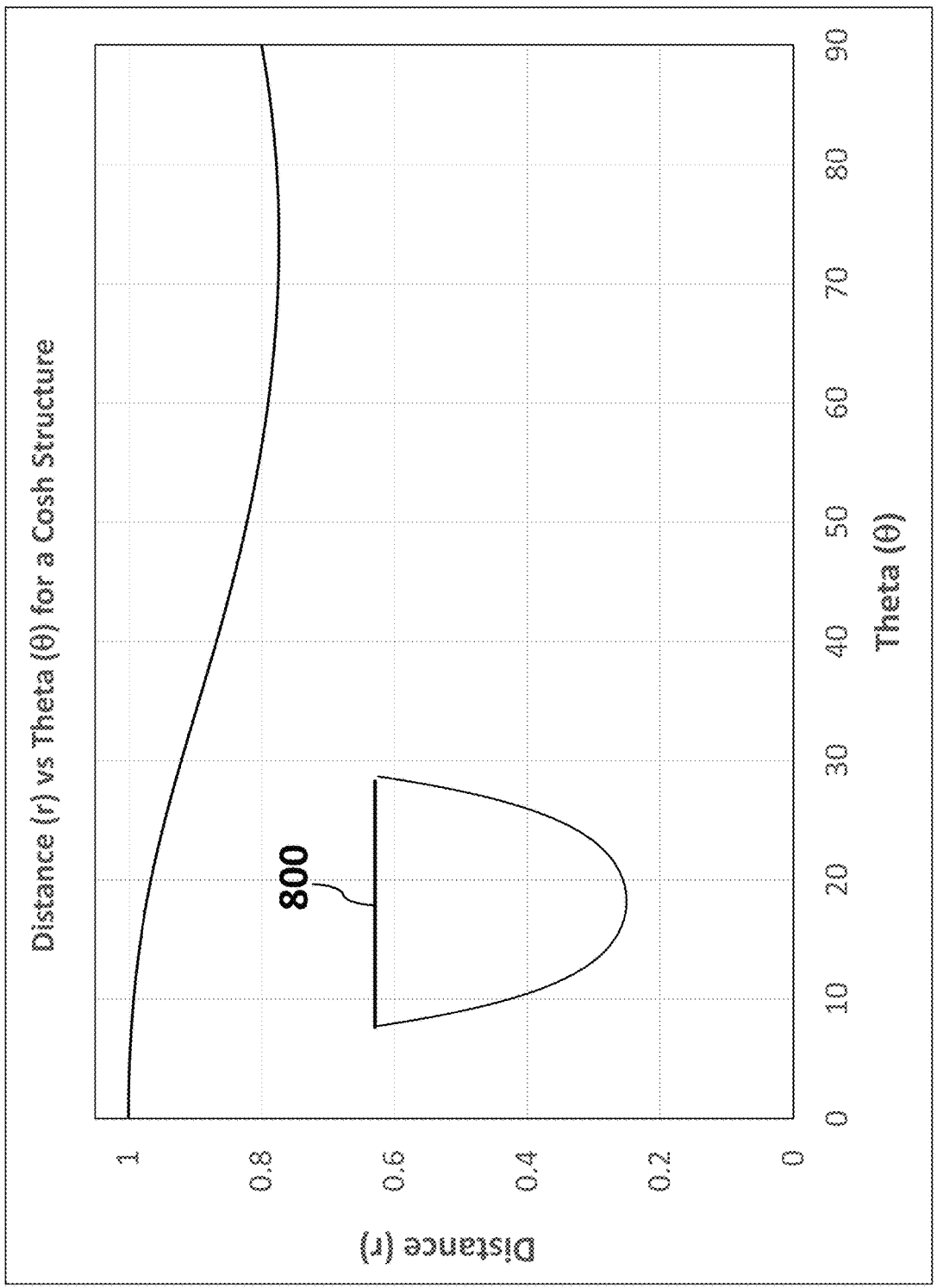
FIG. 8A graphically illustrates the surface of a convex protrusion described by a hyperbolic cosine (cosh) function plotting distance versus theta.

FIG. 8A graphically illustrates the surface of a convex protrusion described by a hyperbolic cosine (cosh) function plotting distance versus theta. The shape of the cosh structure 800 is shown in an inset in the plot. For a cosh structure, distance r varies with respect to angle θ, from 0° to 90°.

Figure 8B:
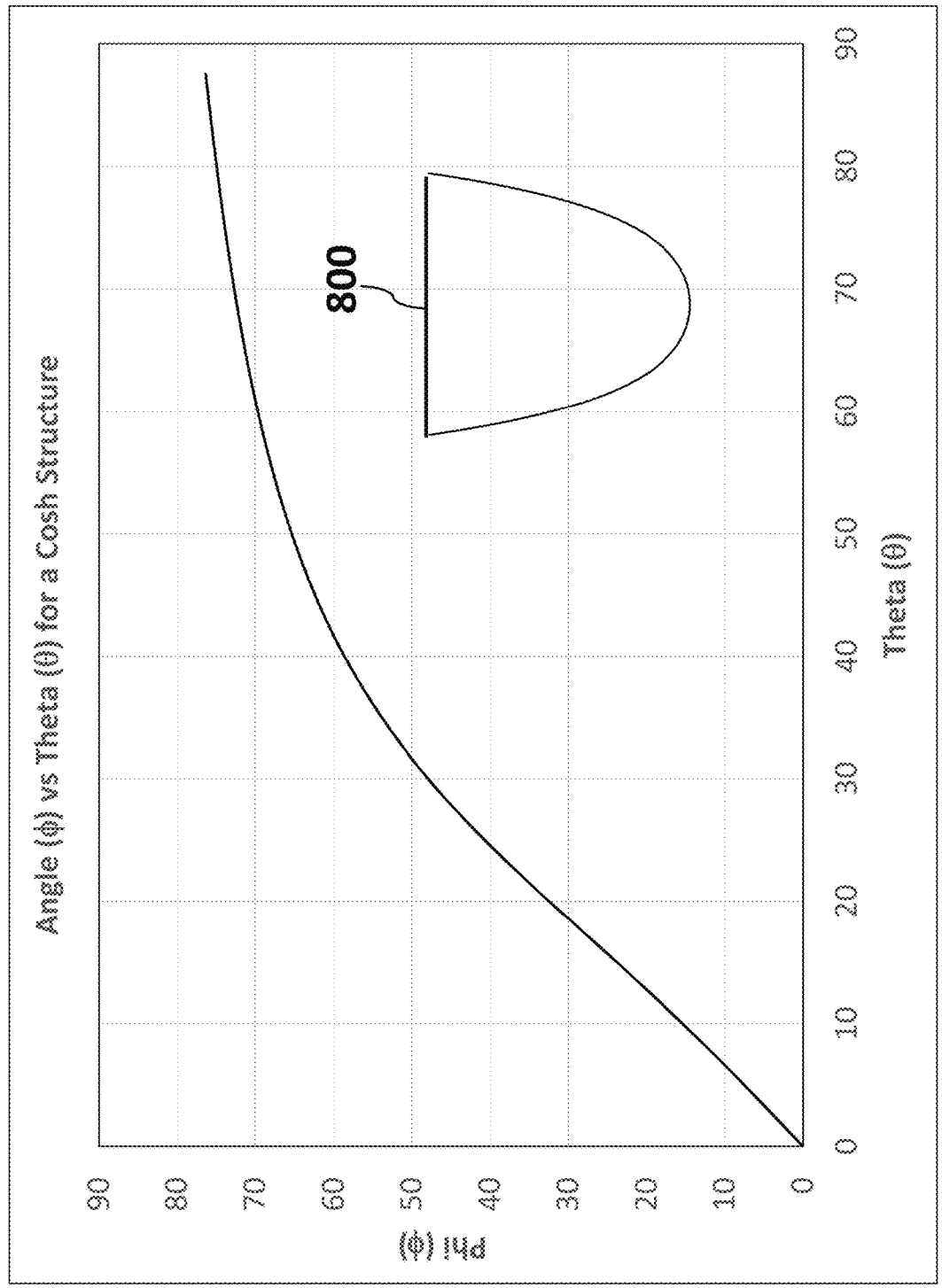
FIG. 8B graphically illustrates the surface of a convex protrusion described by a hyperbolic cosine (cosh) function plotting tangent angle phi versus theta.

FIG. 8B graphically illustrates the surface of a convex protrusion described by a hyperbolic cosine (cosh) function plotting tangent angle phi versus theta. The shape of the cosh structure 800 is shown in an inset in the plot. For cosh structure 800, φ increases approximately linearly with respect to θ, from 0° to about 30° then φ gradually and continually increases to about 75° when θ is equal to 90°.

The variation of φ varies as a function of θ can be used as an initial approximation of the first of the key visual appearance factors, which is the total amount of incident light that undergoes TIR. In order for incident light to undergo TIR, the incident angle must exceed the critical angle, determined by the ratio of the refractive index values for the structure ($\eta_1$) and the rear material ($\eta_3$) as described previously herein and illustrated in Equation (2):

$$\text{incident angle} > \sin^{-1}\left(\frac{\eta_3}{\eta_1}\right) \qquad (2)$$

This condition connects directly to the φ vs θ plots. For the case of incident light that strikes a structure at normal incidence, for any shape the incident angle will be (90°−φ). This means that for any shape, the range of θ angles for which the condition of TIR can be satisfied on the first reflection can be determined. This range of θ angles can be converted to a fraction of the overall area to determine the amount of light that undergoes TIR.

The connection between the φ vs θ plots and the other three key visual appearance factors (the degree of semi-retro-reflection, the degree of diffusion, and the viewing angle response) is more subtle. For the degree of semi-retro-reflection, in order for light to return approximately toward the source, it must undergo a 180° direction change, and a minimum of two reflections are required to achieve this. If there is no variation in the φ vs θ plots, then there are fewer ray paths that can achieve this ~180° direction change, so shapes with φ vs θ plots with greater variation may be more likely to yield a greater degree of semi-retro-reflection. For the degree of diffusion, a diffuse appearance is achieved if there is some variation in the angle of the reflected light. This requires some variation in the path followed by light rays that enter the structure at largely the same incident angle. If there is no variation in the φ vs θ plot for a particular shape, there will be no variation in the path followed by light rays that undergo TIR. If there is variation in the φ vs θ plot, there will be some degree of diffusion in the reflected light. The amount of diffusion will depend on the specific shape details. Lastly for the viewing angle range, for the best performance, the reflectance must remain high for a wide range of viewing angles and the variation with viewing angle should be smooth. To assess the performance at different viewing angles, the same general approach can be taken using the same φ vs θ plots, but with an appropriately adjusted incident angle. The φ vs θ plot for a particular shape of convex protrusion is not sufficient to quantify the visual appearance of a display—quantification requires photometric measurement of physical samples and/or computer modeling. However the φ vs θ plot may be useful for an initial estimate of the performance.

In another embodiment, the surface profile of the convex protrusion can be described by an equation (3) of the form:

$$Y(x) = A\cosh(w^*x) + Y_0 \quad \text{Eq. (3)}$$

In equation (3), A is a constant parameter that can be adjusted in order to scale the entire shape of the protrusion by adjusting the width vs height ratio. Adjusting the width vs height ration narrows or widens the convex protrusion. Parameter w is also a scaling factor similar to A but does so in a different way as w is inside the cosh function. Parameter x is the width of the base of the convex protrusion. In one such example, the surface profile can be described by the equation (4) as follows:

$$Y(x) = 0.123^*\cosh(3.1^*x) - 1.373 \quad \text{Eq. (4)}$$

In this example, the radius of base of the resulting protrusion is considered to have a value of 1. The overall size of the protrusion can be adjusted by scaling the dimensions appropriately.

Figure 9:
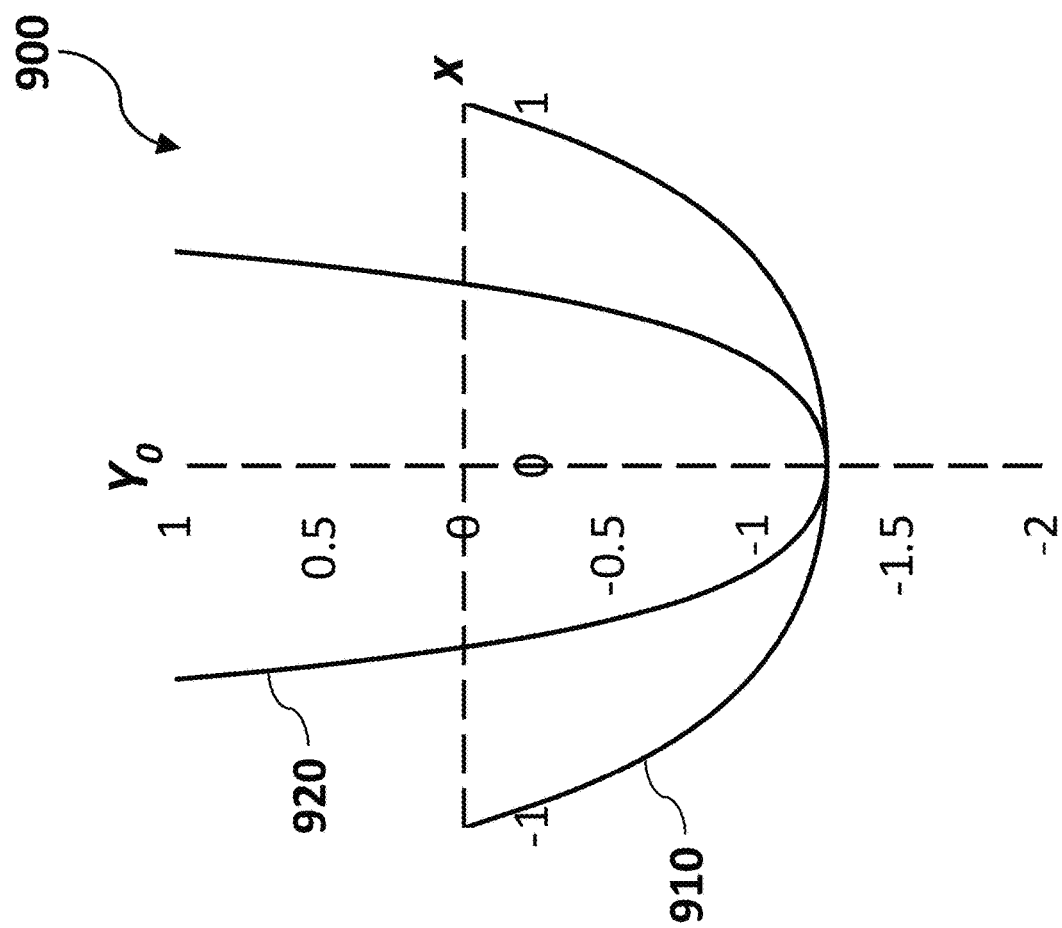
FIG. 9 graphically illustrates how cosh functions in equations 3 and 4 may be used to describe the surface of a convex protrusion.

FIG. 9 graphically illustrates how cosh functions in Eq. 3 may be used to describe the surface of a convex protrusion. Graph 900 illustrates how a plot may be calculated that illustrates the surface of a convex protrusion may be graphed with parameters A, w, x and $Y_0$. Plot 910 results from values A=0.123, $Y_0$=−1.373, w=3.1 and x=1 in Eq. 4. Plot 920 results from values A=0.123, $Y_0$=−1.373, w=6.2 and x=0.5 in Eq. 4.

In another embodiment, the surface profile of the convex protrusion can be described by an equation of the form of equation (5):

$$Y(x) = Y_0 + a_2 x^2 + a_4 x^4 + a_6 x^6 + a_8 x^8 \quad \text{Eq. (5)}$$

In one such example, the surface profile can be described by the equation (6):

$$Y(x) = 60^* x^2 + 4.7 \times 10^{5*} x^4 + 1.5 \times 10^{9*} x^6 + 2.6 \times 10^{12*} x^8 \quad \text{Eq. (6)}$$

The overall size of the protrusion can be adjusted by scaling the dimensions appropriately.

In another embodiment, the surface profile of the convex protrusion can be described by an equation of the form of equation (7):

$$Y(x) = \frac{Cx^2}{1 + \sqrt{1 - (1+k)C^2 x^2}} + a_2 x^2 + a_4 x^4 + a_6 x^6 + Y_0 \quad \text{Eq. (7)}$$

In one such example, the surface profile can be described by equation (7) where the parameters C, k, $a_2$, $a_4$, $a_6$ and as are constants. In one exemplary embodiment, the parameters are as follows: C=150, k=−0.6, $a_2$=−8.0, $a_4$=2×10$^5$, $a_6$=1× 10$^6$ and $Y_0$=−0.0126. The overall size of the protrusion can be adjusted by scaling one or more of the parameters appropriately.

Figure 10A:
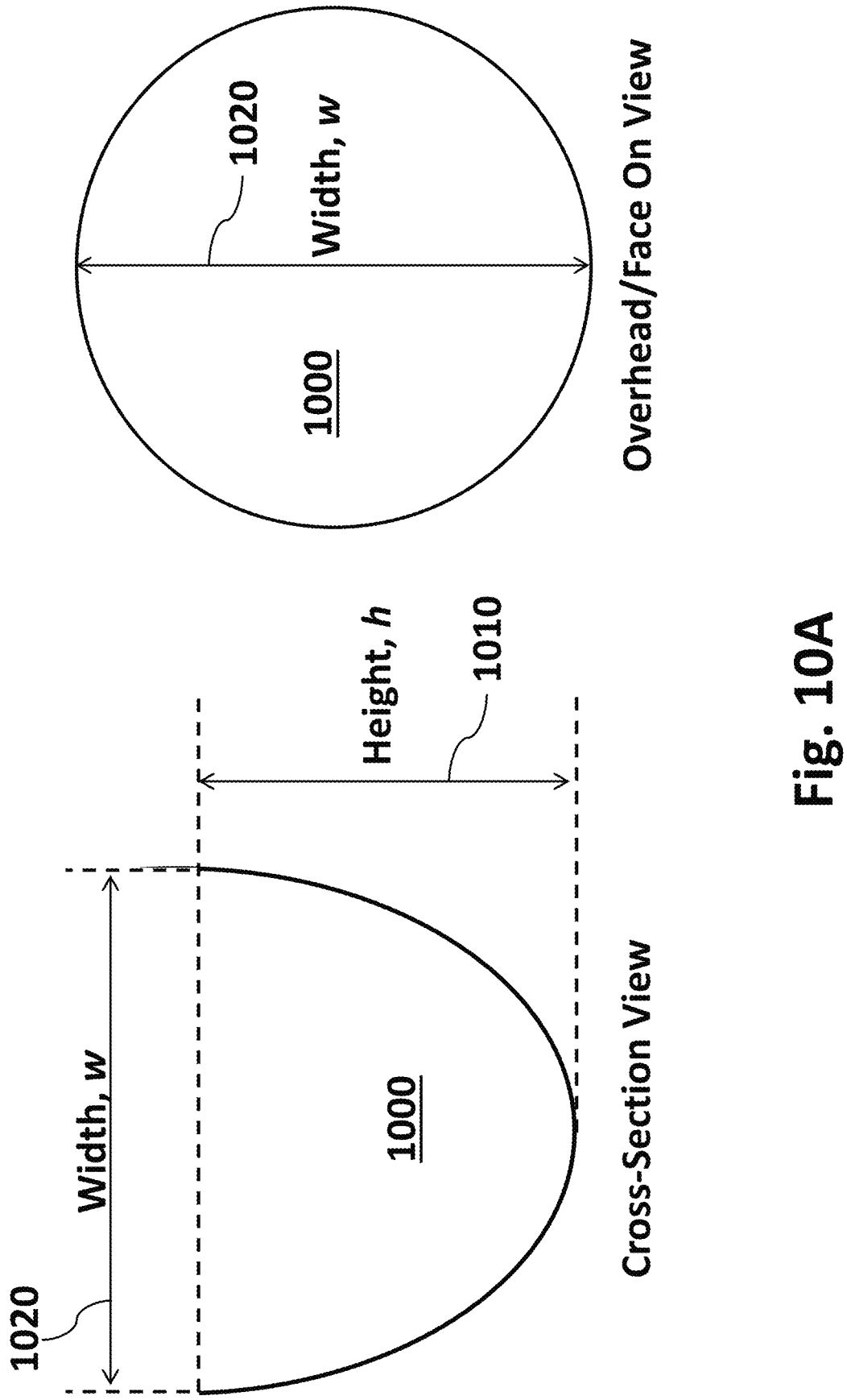
FIG. 10A schematically illustrates a cross-section and an overhead view of a convex protrusion of a TIR-based image display.

In another embodiment, the shape of the convex protrusion can be described as an ellipse. In another embodiment, the shape of the convex protrusion can be described as a combination or hybrid of two shapes. In one such example, the shape can be described as a conical protrusion with a smooth spherical cap. This shape could be described as a hybrid cone-sphere. In such hybrid shapes, it is generally preferred that to have smooth transition in the region between the two shapes. A sufficiently smooth transition is apparent if there are not discontinuities in the φ vs θ polar coordinate plot that describes the hybrid shape. In some embodiments, at least one convex protrusion in a TIR-based image display comprises an aspect ratio (height/weight) in the range of about 0.1-5. FIG. 10A schematically illustrates a cross-section and an overhead view of a convex protrusion of a TIR-based image display. The cross-section of a single convex protrusion is illustrated in the figure on the left and an overhead or face on view in the figure on the right in FIG. 10A. Protrusion 1000 may be one of a plurality of protrusions in a TIR-based image display (e.g., protrusion 110 in FIGS. 1A-B). Protrusions may have a refractive index higher than the refractive index of medium 112 that is in contact with as illustrated in FIGS. 1A-B. Light may be totally internally reflected at the interface of a protrusion and medium. A light ray may be absorbed at the interface of a protrusion and lower refractive index medium by an electrophoretically mobile particle. Protrusion 1000 may be characterized by a height (h) 1010, width (w) 1020 and an aspect ratio (h/w). The height 1010 and width 1020 are denoted by double-headed arrows in FIG. 10A. The aspect ratio may be determined by dividing the height (h) 1010 of the protrusion by the width (w) 1020 of the protrusion. Height 1010 may be measured from the base of the protrusion, where it may be adhered to a sheet of the same or different material, to the top of the protrusion as illustrated in FIG. 10A. Width 1020 of the protrusion may be measured at the widest dimension of the base where it may be adhered to a sheet of same or different material. It should be known that even though that protrusion 1000 is illustrated as symmetrical in FIG. 10A, in other embodiments the protrusions may be asymmetrical.

Protrusion 1000 may be of any shape or size or a mixture of shapes and sizes in a TIR-based image display. Protrusions 1000 may be symmetrical or asymmetrical. Protrusions 1000 may be elongated hemispheres or hexagonally shaped or a combination thereof. In other embodiments the convex protrusions may be microbeads embedded in sheet 1000. The width and height of the microbeads may be measured similarly to the convex protrusions described herein.

In an exemplary embodiment, protrusion 1000 in a TIR-based image display may have a width (w) 1020 of at least about 0.1 microns. Protrusion 1000 may have a width of at least about 2 microns. In some embodiments, protrusion 1000 may have a width in the range of about 0.1-5000 microns. In other embodiments, protrusion 1000 may have a width in the range of about 0.1-500 microns. In still other embodiments, protrusion 1000 may have a width in the range of about 0.1-100 microns. In still other embodiments, protrusion 1000 may have a width in the range of about 0.1-40 microns. In still other embodiments, protrusion 1000 may have a width in the range of about 0.1-20 microns.

In an exemplary embodiment, protrusion 1000 may have a height 910 of at least about 0.1 microns. In some embodiments, protrusion 1000 may have a height in the range of about 0.1-5000 microns. In other embodiments, protrusion 1000 may have a height in the range of about 0.1-500 microns. In still other embodiments, protrusion 1000 may have a height in the range of about 0.1-100 microns. In still other embodiments, protrusion 1000 may have a height in the range of about 0.1-40 microns. In still other embodiments, protrusion 1000 may have a height in the range of about 0.1-20 microns.

In an exemplary embodiment, protrusion 1000 in FIG. 10A may have an aspect ratio (h/w) of at least about 0.1. In some embodiments, protrusion 1000 may have an aspect ratio in the range of about 0.1-10. In other embodiments, protrusion 1000 may have an aspect ratio (h/w) in the range of about 0.1-5. In an exemplary embodiment, protrusion 1000 may have an aspect ratio in the range of about 0.5-2. In an exemplary embodiment, protrusion 1000 may comprise a shape with an aspect ratio of about 0.3-0.7.

Figure 10B:
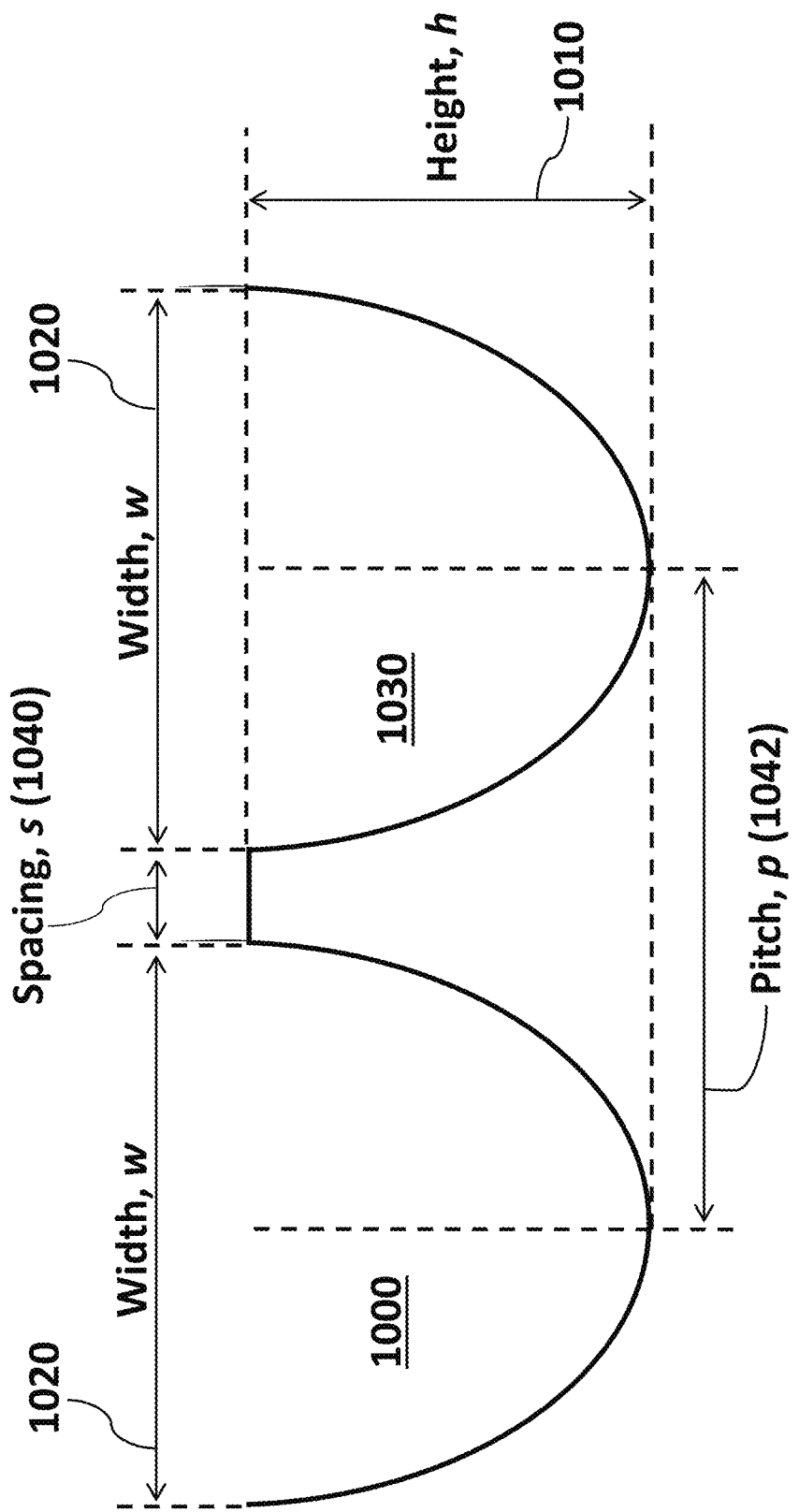
FIG. 10B schematically illustrates a cross-section of two convex protrusions of a TIR-based image display separated by a spacing.

A TIR-based image display as illustrated in FIG. 1A may comprise at least one convex protrusion adjacent to a second convex protrusion separated by a distance or spacing. FIG. 10B schematically illustrates a cross-section of two convex protrusions of a TIR-based image display separated by a spacing. In the embodiment shown in FIG. 10B, a first protrusion 1000 is adjacent a second protrusion 1030 and have approximately the same dimensions of height and width. In other embodiments, adjacent protrusions in a TIR-based image display may have different dimensions of height and width. In some embodiments, spacing (s) 1040 between adjacent protrusions may be greater than about 0.001 microns. In other embodiments, the spacing may be in the range of about 0.001-10 microns. In still other embodiments, the spacing may be in the range of about 0.001-2 microns. In an exemplary embodiment, the spacing between two adjacent protrusions in a TIR-based image display may be in the range of about 0.1-2 microns. Spacing may also be described by pitch 1042. Pitch 1042 is the peak-to-peak distance between adjacent convex protrusions. For convex protrusions of similar size, pitch 1042 is the sum of the width of a convex protrusion and the spacing distance. Thus, when adjacent convex protrusions touch and there is no spacing, the pitch is equal to the diameter of a convex protrusion. In some embodiments, pitch 1042 may vary from protrusion to protrusion as the size of the protrusions vary within an array.

In other embodiments, the spacing distance 1040 may be a fraction of the width of the convex protrusions, such as ratio s/w. The ratio s/w may be at least about 0.001 or higher. In some embodiments, ratio s/w may be at least about 0.01 or higher. In some embodiments, ratio s/w may be at least about 0.1 or higher. In some embodiments, ratio s/w may be in the range of about 0.01-0.1. In other embodiments, ratio s/w may be in the range of about 0.01-0.5.

Figure 10C:
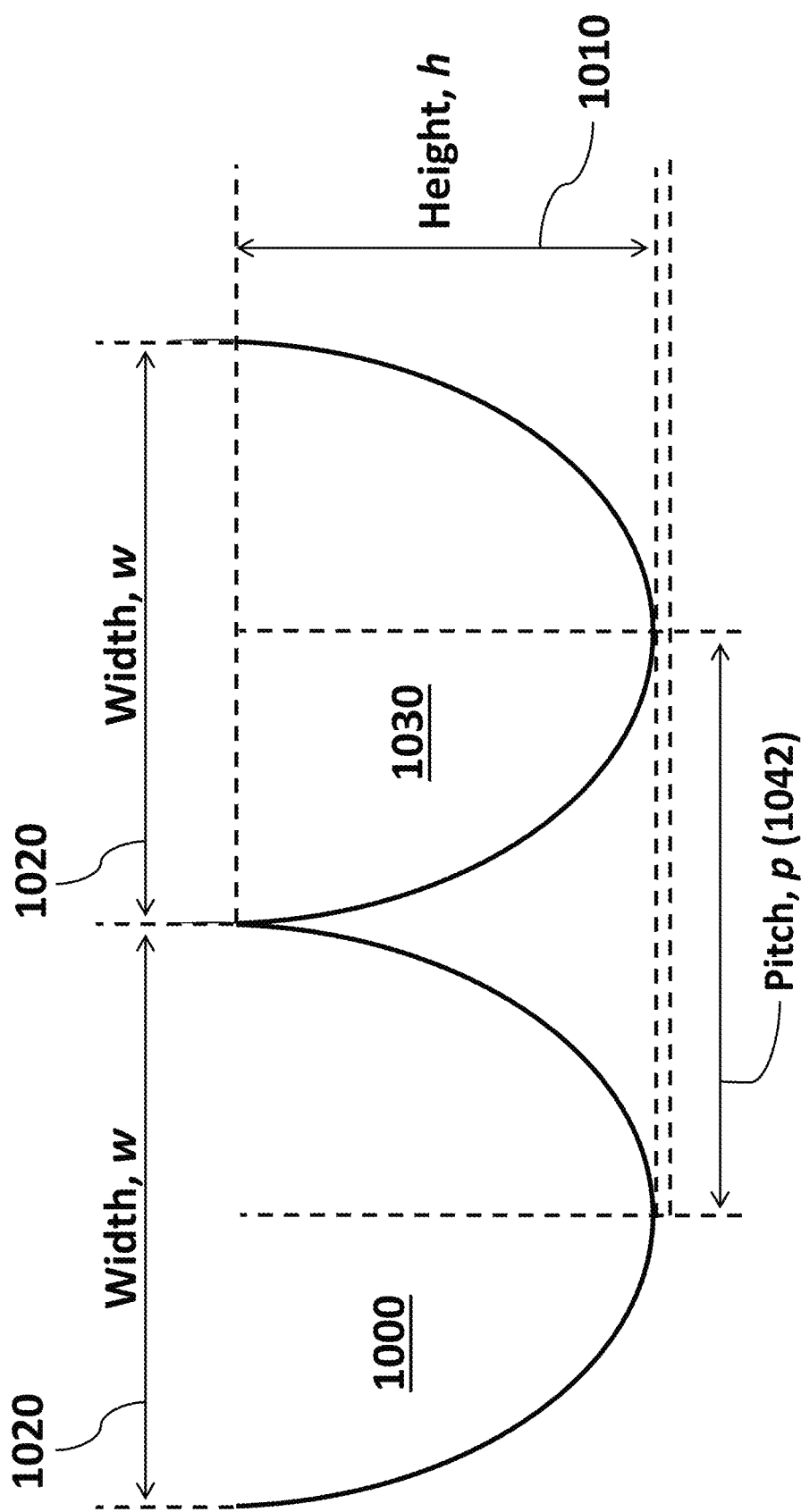
FIG. 10C schematically illustrates a cross-section of two convex protrusions of a TIR-based image display with no spacing.

A TIR-based image display as illustrated in FIG. 1A may comprise at least one convex protrusion adjacent to a second convex protrusion with no distance or spacing between the protrusions. FIG. 10C schematically illustrates a cross-section of two convex protrusions of a TIR-based image display with no spacing. In some embodiments, a first convex protrusion 1000 and a second convex protrusion 1030 in a TIR-based image display may touch at the base such that there is no spacing.

Figure 10D:
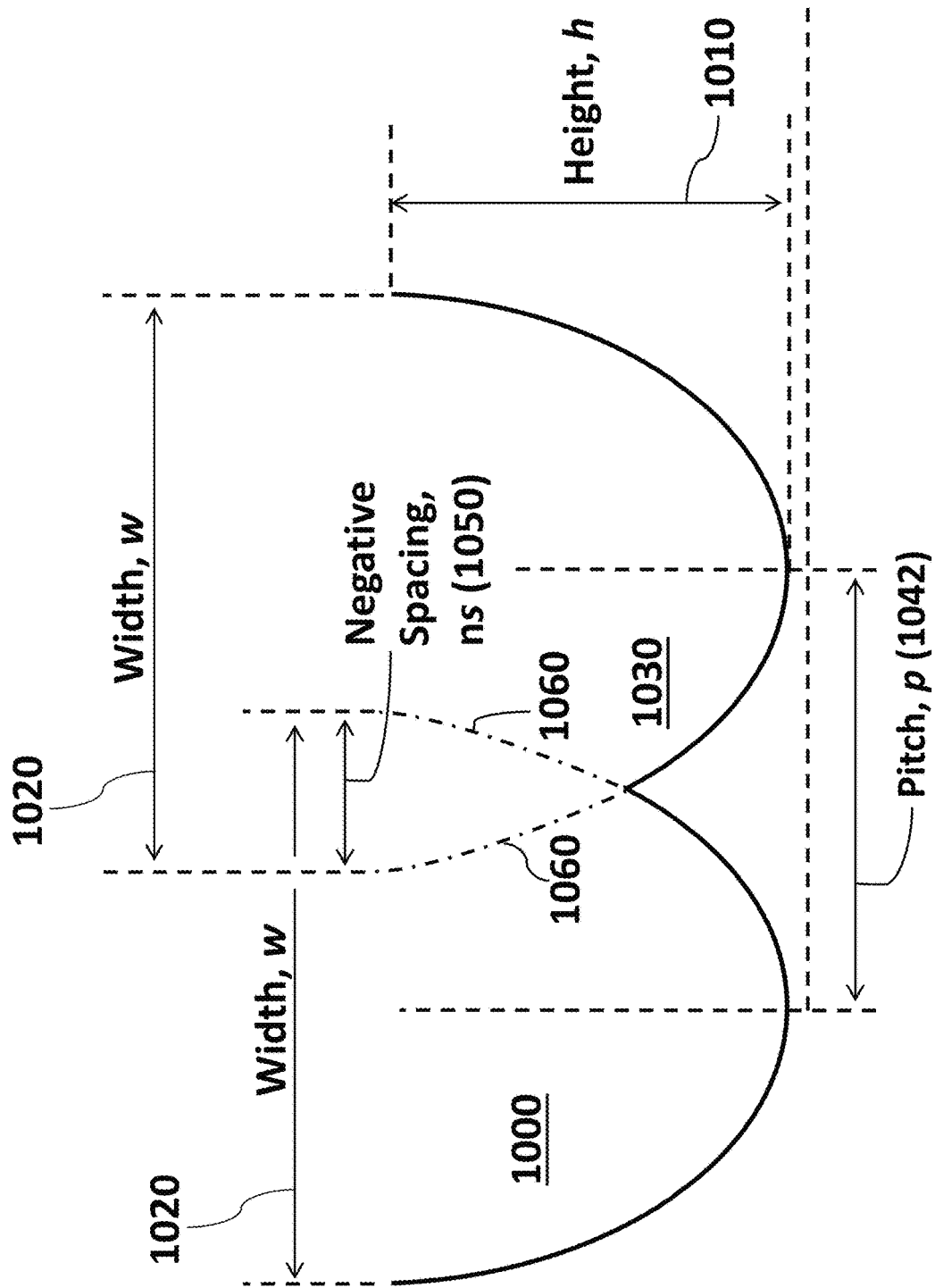
FIG. 10D schematically illustrates a cross-section of two convex protrusions of a TIR-based image display with negative spacing.

A TIR-based image display as illustrated in FIG. 1A may comprise at least one convex protrusion adjacent to a second convex protrusion with a negative distance or spacing between the protrusions. FIG. 10D schematically illustrates a cross-section of two convex protrusions of a TIR-based image display with negative spacing. Negative spacing (ns) may occur when there is overlap between adjacent protrusions. Protrusions 1000/1030 in FIG. 10D have overlap where dot-dashed lines 1060 shows the outline of a protrusion if the protrusion did not make contact as illustrated in FIG. 10B or touching at the base as illustrated in FIG. 10C. In some embodiments, negative spacing between two adjacent convex protrusions in a TIR-based image display may be greater than about 0.001 microns. In other embodiments, the negative spacing may be in the range of about 0.001-10 microns. In still other embodiments, the negative spacing may be in the range of about 0.001-2 microns. In an exemplary embodiment, the negative spacing between two adjacent protrusions in a TIR-based image display may be in the range of about 0.1-5 microns.

In other embodiments, the negative spacing distance 1050 may be a fraction of the width of the convex protrusions, such as ratio ns/w. The ratio ns/w may be at least about 0.001 or higher. In some embodiments, ratio ns/w may be at least about 0.01 or higher. In some embodiments, ratio ns/w may be at least about 0.1 or higher. In some embodiments, ratio ns/w may be in the range of about 0.01-0.1. In other embodiments, ratio ns/w may be in the range of about 0.01-0.5.

It should be known that the dimensions of height, width and spacing distance of adjacent protrusions in TIR-based image displays may be determined by their application and the lighting conditions that the display may be subjected to. The dimensions may be tuned such that the display brightness may be optimized for viewing conditions of the respected application.

Figure 10E:
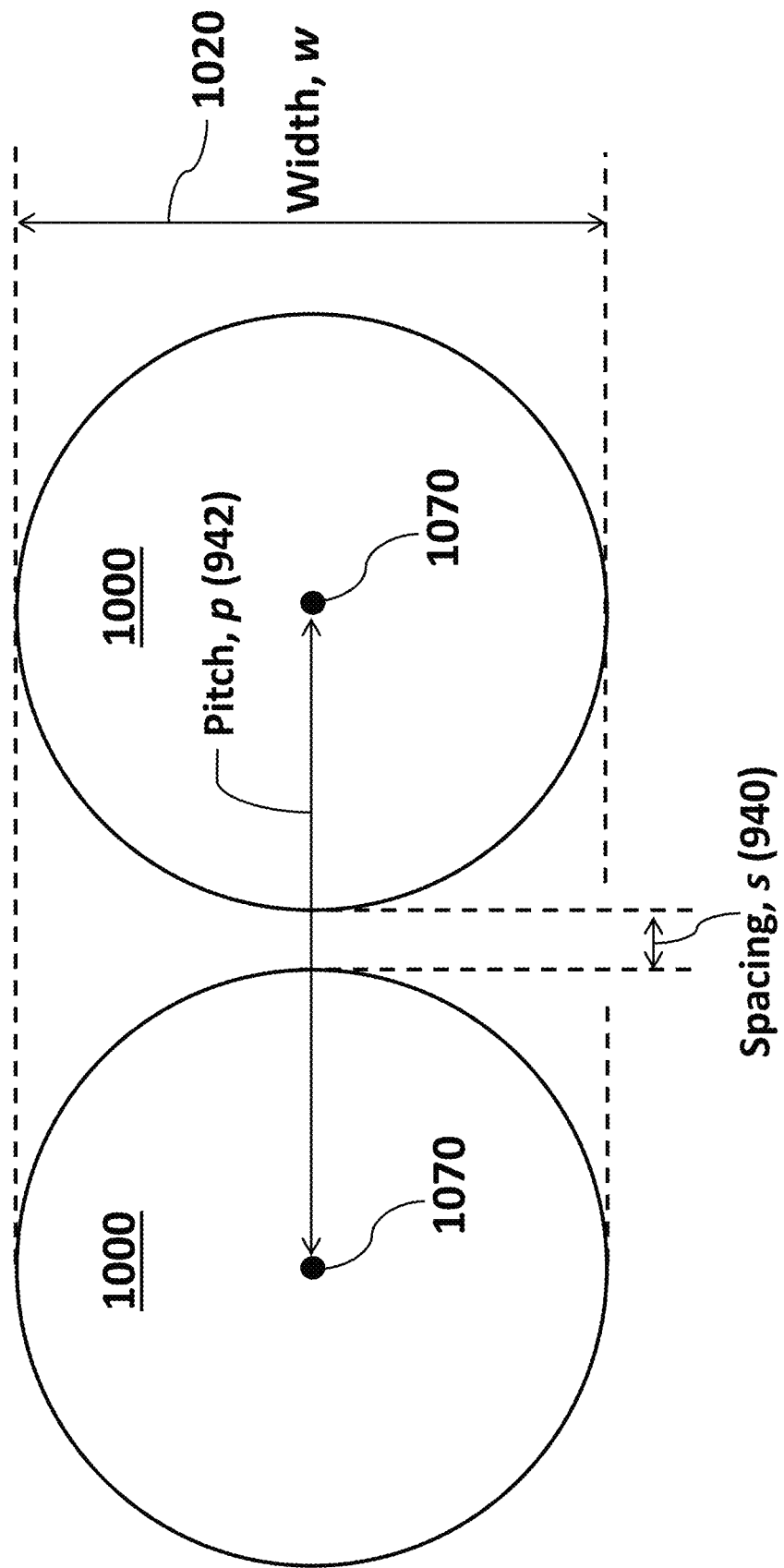
FIG. 10E schematically illustrates a face-on or overhead view of two convex protrusions of a TIR-based image display separated by a spacing.

FIG. 10E schematically illustrates a face-on or overhead view of two convex protrusions of a TIR-based image display separated by a spacing. FIG. 10E illustrates from a different perspective of the convex protrusions and how they are arranged with respect to each other by the pitch and spacing. Point 1070 is the approximate peak of each protrusion whereas pitch 1042 is the peak-to-peak distance. Spacing 1040 is also illustrated in FIG. 10E as the distance between the bases of the convex protrusions.

In an exemplary embodiment, protrusions 1000, 1030 may comprise a high refractive index polymer. The refractive index of protrusions 1000, 1030 may be greater than about 1.4. In some embodiments, convex protrusions 1000, 1030 may be in the shape of hemispheres. Protrusions 1000, 1030 may be of any shape or size or a mixture of shapes and sizes. Protrusions 1000, 1030 may be elongated hemispheres or hexagonally shaped or a combination thereof. In other embodiments the convex protrusions may be microbeads embedded in sheet 1000, 1030. Protrusions 1000, 1030 may have a refractive index of about 1.5 or higher. In an exemplary embodiment, protrusions 1000, 1030 may have a refractive index of about 1.5-1.9. In certain embodiments, the protrusions may include materials having a refractive index in the range of about 1.5 to 2.2. In certain other embodiments, the high refractive index protrusions may be a material having a refractive index of about 1.6 to about 1.9. Protrusions 1000, 1030 may be comprised of a substantially rigid, high index material. High refractive index polymers that may be used may comprise high refractive index additives such as metal oxides. The metal oxides may comprise one or more of $SiO_2$, $ZrO_2$, $ZnO_2$, $ZnO$ or $TiO_2$. In some embodiments the protrusions may be faceted at the base and morph into a smooth hemispherical or circular shape at the top. In other embodiments, protrusions 1000, 1030 may be hemispherical or circular in one plane and elongated in another plane.

In an exemplary embodiment, at least one of convex protrusions 1000, 1030 in a TIR-based image display may be formed by one or more of micro-replication, microthermoforming, microinjection molding or microembossing. In an exemplary embodiment, at least one of convex protrusions 1000, 1030 may be formed by the 3M (Maplewood, MN, USA) microreplication technology. In an exemplary embodiment, at least one of convex protrusions 1000, 1030 may be formed by one or more processes of thermoplastic nanoimprint lithography, photo nanoimprint lithography, resist-free direct thermal nanoimprint lithography roller nanoimprinting, ultrafast nanoimprint lithography, laser assisted direct imprint lithography or electrochemical nanoimprinting. In an exemplary embodiment, at least one of convex protrusions 1000, 1030 may be formed by one or more of microlithography, electron beam lithography, interference lithography, X-ray lithography, extreme ultraviolet lithography, magnetolithography or scanning probe lithography.

Any of the TIR-based display embodiments described herein may comprise a color filter array layer. The color filter layer may comprise one or more of red, green, blue, white, clear, cyan, magenta or yellow filters. In an exemplary embodiment, the color filter layer may be one or more of flexible or conformable. In an exemplary embodiment, at least one or more convex protrusions may be aligned or registered with a color filter.

Figure 11:
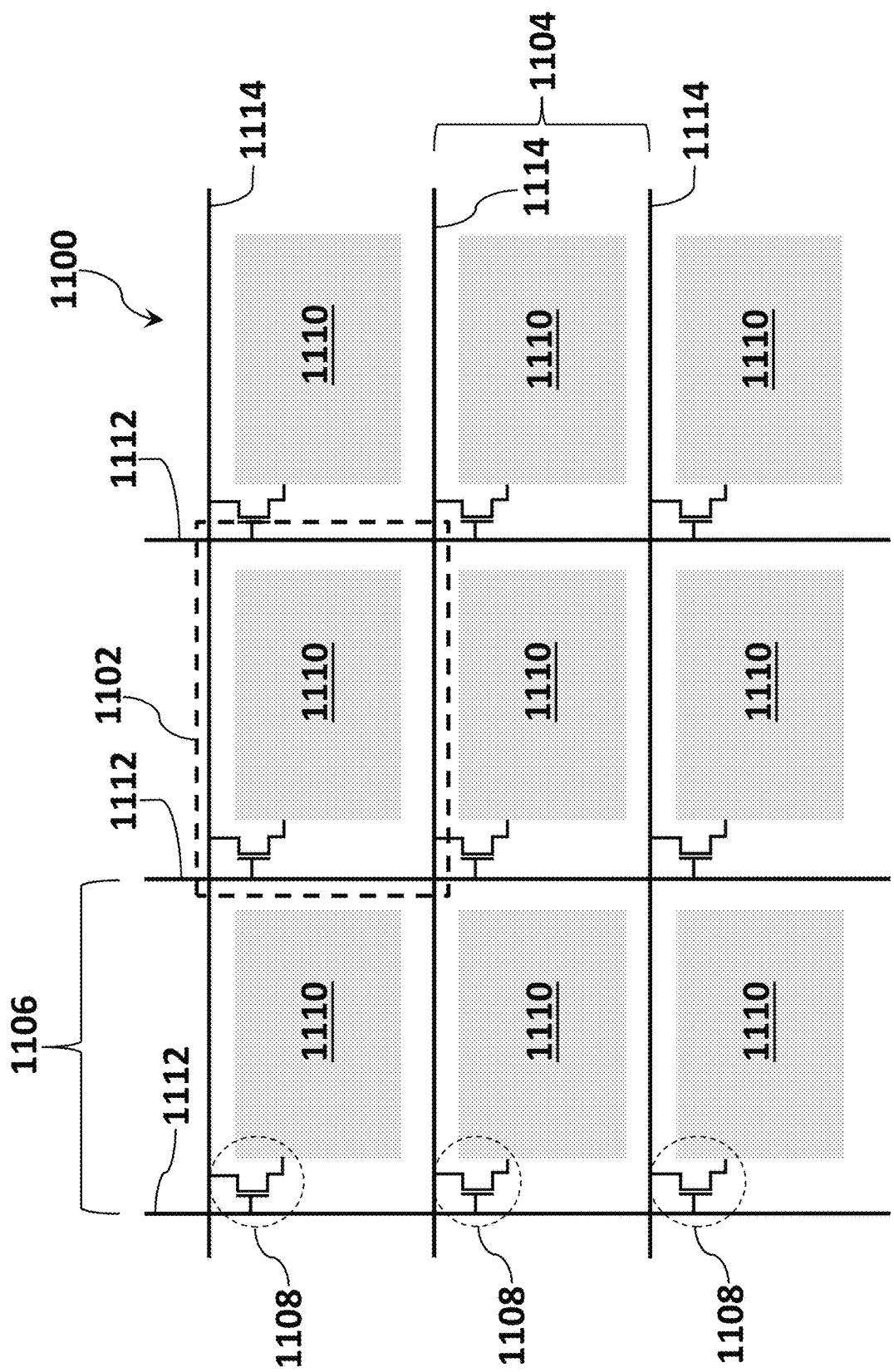
FIG. 11 schematically illustrates an embodiment of a TFT array to drive a display.

Any of the TIR-based image display embodiments described herein may further comprise a TFT array. FIG. 11 schematically illustrates an embodiment of a TFT array to drive a display. The TFT array is similar to the arrays used to drive conventional LCD displays. The movement of electrophoretically mobile particles may be controlled by TFT array embodiment 1100 in FIG. 11. In an exemplary embodiment, TFT array 1100 may be used as a top electrode layer. In other embodiments, TFT array 1100 may be used as the bottom electrode layer. TFT array 1100 may comprise an array of pixels 1002 to drive the display embodiments described herein. A single pixel 1102 is highlighted by a dotted line box in FIG. 11. Pixels 1102 may be arranged in rows 1104 and columns 1106 as illustrated in FIG. 11 but other arrangements may be possible. In an exemplary embodiment, each pixel 1102 may comprise a single TFT 1108. In array embodiment 1100, each TFT 1108 may be located in the upper left of each pixel 1102. In other embodiments, the TFT 1108 may be placed in other locations within each pixel 1102. Each pixel 1102 may further comprise a conductive layer 1110 to address each pixel of the display. Layer 1110 may comprise ITO, aluminum, copper, gold, Baytron™, or conductive nanoparticles, silver wires, metal nanowires, graphene, nanotubes, or other conductive carbon allotropes or a combination of these materials dispersed in a polymer. TFT array embodiment 1100 may further comprise column 1112 and row 1114 wires. Column wires 1112 and row wires 1114 may comprise a metal such as aluminum, copper, gold or other electrically conductive metal. Column 1112 and row 1114 wires may comprise ITO. The column 1112 and row 1114 wires may be attached to the TFTs 1108. Pixels 1102 may be addressed in rows and columns. TFTs 1108 may be formed using amorphous silicon or polycrystalline silicon. The silicon layer for TFTs 1108 may be deposited using plasma-enhanced chemical vapor deposition (PECVD). In an exemplary embodiment, each pixel may be substantially aligned with a single color filter in a color filter layer. Column 1112 and row 1114 wires may be further connected to integrated circuits and drive electronics to drive the display.

Any of the display embodiments described herein may comprise a diffuser layer. A diffuser layer may be used to soften the incoming light or reflected light or to reduce glare. Diffuser layer may comprise a flexible polymer. Diffuser layer may comprise ground glass in a flexible polymer matrix. Diffuser may comprise a micro-structured or textured polymer. Diffuser layer may comprise 3M™ antisparkle or anti-glare film. Diffuser layer may comprise 3M™ GLR320 film (Maplewood, MN) or AGF6200 film. A diffuser layer may be located at one or more various locations within the display embodiments described herein.

Any of the display embodiments described herein may further comprise at least one optically clear adhesive (OCA) layer. OCA layer may be flexible or conformable. OCA's may be used to adhere display layers together and to optically couple the layers. Any of the display embodiments described herein may comprise optically clear adhesive layers further comprised of one or more of 3M™ optically clear adhesives 3M™ 8211, 3M™ 8212, 3M™ 8213, 3M™ 8214, 3M™ 8215, 3M™ OCA 8146-X, 3M™ OCA 817X, 3M™ OCA 821X, 3M™ OCA 9483, 3M™ OCA 826XN or 3M™ OCA 8148-X, 3M™ CEF05XX, 3M™ CEF06XXN, 3M™ CEF19XX, 3M™ CEF28XX, 3M™ CEF29XX, 3M™ CEF30XX, 3M™ CEF31, 3M™ CEF71XX, Lintec MO-T020RW, Lintec MO-3015UV series, Lintec MO-T015, Lintec MO-3014UV2+, Lintec MO-3015UV.

Any of the display embodiments described herein may further include at least one optional dielectric layer. The one or more optional dielectric layers may be used to protect one or both of the layers in any of the display embodiments described herein. In some embodiments, the dielectric layers may comprise different compositions. The dielectric layers may be substantially uniform, continuous and substantially free of surface defects. The dielectric layers may be at least about 5 nm in thickness or more. In some embodiments, the dielectric layer thickness may be about 5 to 300 nm. In other embodiments, the dielectric layer thickness may be about 5 to 200 nm. In still other embodiments, the dielectric layer thickness may be about 5 to 100 nm. The dielectric layers may each have a thickness of at least about 30 nanometers. In an exemplary embodiment, the thickness may be about 30-200 nanometers. In other embodiments, parylene may have a thickness of about 20 nanometers. The dielectric layers may comprise at least one pin hole. The dielectric layer may define a conformal coating and may be free of pin holes or may have minimal pin holes. The dielectric layer may also be a structured layer. The dielectric layer may also act as a barrier layer to prevent moisture or gas ingress. The dielectric layers may have a high or low dielectric constant. The dielectric layers may have a dielectric constant in the range of about 1-15. Dielectric compounds may be organic or inorganic in type. The most common inorganic dielectric material is $SiO_2$ commonly used in integrated chips. The dielectric layer may be SiN. The dielectric layer may be $Al_2O_3$. The dielectric layer may be a ceramic. Organic dielectric materials are typically polymers such as polyimides, fluoropolymers, polynorbornenes and hydrocarbon-based polymers lacking polar groups. The dielectric layers may be a polymer or a combination of polymers. The dielectric layers may be combinations of polymers, metal oxides and ceramics. In an exemplary embodiment, the dielectric layers comprise parylene. In other embodiments the dielectric layers may comprise a halogenated parylene. Other inorganic or organic dielectric materials or combinations thereof may also be used for the dielectric layers. One or more of the dielectric layers may be CVD or sputter coated. One or more of dielectric layers may be a solution coated polymer, vapor deposited dielectric or sputter deposited dielectric.

Any of the display embodiments described herein may further comprise a conductive cross-over. A conductive cross-over may bond to the front electrode layer and to a trace on the rear electrode layer such as a TFT. This may allow a driver integrated circuit (IC) to control the voltage at the front electrode. In an exemplary embodiment, the conductive cross-over may comprise an electrically conductive adhesive that is flexible or conformable.

At least one edge seal may be employed with the disclosed display embodiments. The edge seal may prevent ingress of moisture, air or other environmental contaminants from entering the display. The edge seal may be a thermally, chemically or a radiation cured material or a combination thereof. The edge seal may comprise one or more of an epoxy, silicone, polyisobutylene, acrylate or other polymer based material. In some embodiments the edge seal may comprise a metallized foil. In some embodiments the edge sealant may comprise a filler such as $SiO_2$ or $Al_2O_3$. In other embodiments, the edge seal may be flexible or conformable after curing. In still other embodiments, the edge seal may also act as a barrier to moisture, oxygen and other gasses. At least one edge seal may comprise one or more of Sekisui Chemical (Osaka, Japan) SUR-137, Kyoritsu Chemical (Tokyo, Japan) 723K, Nagase (Tokyo, Japan) XNR5570 or Nagase XNR5588LV.

At least one sidewall (may also be referred to as crosswalls or partition walls) may be employed with the disclosed display embodiments. In an exemplary embodiment, sidewalls may substantially maintain a uniform gap distance within specified areas of the display embodiments such as between the front and rear electrodes. Sidewalls may also act as a barrier to aid in preventing prevent moisture and oxygen ingress into the display. The sidewalls may be located within the light modulation layer comprising the liquid crystals, electrowetting solution or other materials. The sidewalls may comprise polymer, metal or glass or a combination thereof. The sidewalls may be any size or shape. The sidewalls may have a rounded cross-section. The sidewalls or cross-walls may be configured to create wells or compartments in, for example, square-like, triangular, pentagonal or hexagonal shapes or a combination thereof. The sidewalls may comprise a polymeric material and patterned by one or more conventional techniques including photolithography, embossing or molding. In an exemplary embodiment, the sidewalls may be comprised of a flexible or conformal polymer. In some embodiments, the sidewalls may be colored and comprise one or more of a dye or pigment.

In some embodiments, any of the display embodiments described herein may comprise at least one partial wall or a full wall of height in the range of about 1-50 μm. In other embodiments, the height of the walls may be in the range of about 2-30 μm. In still other embodiments, the height of the walls may be in the range of about 5-25 μm. In an exemplary embodiment, the height of the walls may be in the range of about 10-25 μm.

In some embodiments, any of the display embodiments described herein may comprise at least one partial wall or a full wall of width in the range of about 1-30 μm. In other embodiments, the width of the walls may be in the range of about 1-20 μm. In still other embodiments, the width of the walls may be in the range of about 2-15 μm. In an exemplary embodiment, the width of the walls may be in the range of about 4-10 μm.

In some embodiments, the aspect ratio of wall height/wall width is in the range of about 1-25. In other embodiments, the aspect ratio of wall height/wall width is in the range of about 1-15. In still other embodiments, the aspect ratio of wall height/wall width is in the range of about 1-5. In an exemplary embodiment, the aspect ratio of wall height/wall width is in the range of about 1-2.

Any of the display embodiments described herein may further include a rigid or flexible directional front light system. Directional front light system may comprise an outer surface a facing viewer. A front light system may comprise a light source to emit light through an edge of a light guide. A light source may comprise one or more of a light emitting diode (LED), cold cathode fluorescent lamp (CCFL) or a surface mounted technology (SMT) incandescent lamp. In an exemplary embodiment, a light source may define an LED whose output light emanates from a refractive or reflective optical element that concentrates said diode's output emission in a condensed angular range to an edge of a light guide. In some embodiments, a light source may be optically coupled to a light guide. In an exemplary embodiment, a directional front light system may be flexible or conformable.

The light guide may comprise one or more of a glass or polymer. The light guide may comprise one or more of a flexible or conformable polymer. The light guide may comprise more than one layer. The light guide may comprise one or more contiguous light guiding layers parallel to each other. The light guide may comprise at least a first light guiding layer that forms a transparent bottom surface. The light guide may comprise a second layer that forms a transparent top or outer surface. The light guide may comprise a third layer that forms a central transparent core. The refractive indices of the layers of the light guide may differ by at least 0.05. The multiple layers may be optically coupled. In an exemplary embodiment, the light guide may comprise an array of light extractor elements. The light extractor elements may comprise one or more of light scattering particles, dispersed polymer particles, tilted prismatic facets, parallel prism grooves, curvilinear prism grooves, curved cylindrical surfaces, conical indentations, spherical indentations or aspherical indentations. The light extractor elements may be arranged such that they redirect light towards semi-retro-reflective interface of the convex protrusions and a low refractive index medium in a substantially perpendicular direction with a non-Lambertian narrow-angle distribution. The light guide may comprise diffusive optical haze. The light guide may comprise air pockets. The light guide system in some embodiments may comprise of a light guide system used with conventional LCD displays or a FLEx Front Light Panel made from FLEx Lighting (Chicago, IL). The light guide may comprise an ultra-thin, flexible light guide film manufactured by Nanocomp Oy, Ltd. (Lehmo, Finland).

In some embodiments, a porous reflective layer may be used in combination with the disclosed display embodiments. The porous reflective layer may be interposed between the front and rear electrode layers. In other embodiments the rear electrode may be located on the surface of the porous electrode layer.

Various control mechanisms for the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

In some embodiments, a tangible machine-readable non-transitory storage medium that contains instructions may be used in combination with the disclosed display embodiments. In other embodiments the tangible machine-readable non-transitory storage medium may be further used in combination with one or more processors.

FIG. 12 shows an exemplary system for controlling a display according to one embodiment of the disclosure. In FIG. 12, display 1200 is controlled by controller 1240 having processor 1230 and memory 1220. Other control mechanisms and/or devices may be included in controller 1240 without departing from the disclosed principles. Controller 1240 may define hardware, software or a combination of hardware and software. For example, controller 1240 may define a processor programmed with instructions (e.g., firmware). Processor 1230 may be an actual processor or a virtual processor. Similarly, memory 1220 may be an actual memory (i.e., hardware) or virtual memory (i.e., software).

Memory 1220 may store instructions to be executed by processor 1230 for driving display 100. The instructions may be configured to operate display 100. In one embodiment, the instructions may include biasing electrodes associated with display 100 through power supply 1250. When biased, the electrodes may cause movement of electrophoretic particles towards or away from a region proximal to the surface of the plurality of protrusions at the inward surface of the front transparent sheet to thereby absorb or reflect light received at the inward surface of the front transparent sheet. By appropriately biasing the electrodes, electrophoretically mobile particles (e.g., particles 122 in FIG. 1A) may be controlled. Absorbing the incoming light at the interface of a high refractive index protrusion and low index medium creates a dark or colored state. By appropriately biasing the electrodes, electrophoretically mobile particles (e.g., particles 122 in FIG. 1A) may be moved away from the interface of a high refractive index protrusion and a low index of refraction medium in order to reflect or absorb the incoming light. Reflecting the incoming light creates a light state.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane.

In the exemplary display embodiments described herein, they may be used IoT and non-IoT applications such as in, but not limited to, electronic book readers, portable computers, tablet computers, cellular telephones, smart cards, signs, watches, wearables, military display applications, automotive displays, automotive license plates, shelf labels, flash drives and outdoor billboards or outdoor signs comprising a display. The displays may be powered by one or more of a battery, solar cell, wind, electrical generator, electrical outlet, AC power, DC power or other means.

The following non-limiting exemplary embodiments are provided to further illustrate different implementations accosting to certain disclosed embodiments.

Example 1 is directed to a totally internally reflective (TIR) image display, comprising: a front assembly having a light guide, a front sheet, a front electrode and a plurality of convex protrusions, each of the plurality of convex protrusions having a respective dark pupil area, the front assembly forming a side edge; a light source to emit light through an edge of the light guide; a back assembly forming a gap with the front assembly, the back assembly having a back plane and a rear electrode; and a medium disposed in the gap, the medium including a plurality of electrophoretic particles movable to one of the front electrode or the rear electrode responsive to an applied bias; wherein at least one of the plurality of convex protrusions is configured to minimize the dark pupil area.

Example 2 is directed to the display of example 1, wherein the plurality of convex protrusions overlap.

Example 3 is directed to the display of example 1, wherein a pair of adjacent protrusions are separated by a spacing (s) and wherein the distance between the pair of adjacent protrusions (p) such that s is a fraction of p.

Example 4 is directed to the display of example 1, wherein at least one convex protrusion is defined by a height (h) and a width (w) and wherein the ratio of the height to the width is in the range of about 0.3-0.7.

Example 5 is directed to the display of example 1, wherein at least one convex protrusion comprises a surface profile defined by the equation: Y(x)=0.123*cosh(3.1*x)−1.373.

Example 6 is directed to the display of example 1, wherein at least one convex protrusion comprises a surface profile defined by the equation: Y(x)=Y0+a2x2+a4x4+a6x6+a8x8; in which Y0, a1, a4, a6 and a8 are constants.

Example 7 is directed to the display of example 1, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which $a_1$, k, C, a4, a6 and a8 are constants.

Example 8 is directed to a totally internally reflective (TIR) image display, comprising: a front assembly having a front sheet, a front electrode and a dielectric layer, the front electrode interposed between the front sheet and the dielectric layer, the front sheet further including a plurality of convex protrusions, each of the plurality of convex protrusions having a respective dark pupil area; and a back assembly forming a gap with the front assembly, the back assembly having a back plane and a rear electrode, the rear electrode positioned opposite the dielectric layer; wherein at least one of the plurality of convex protrusions is configured to minimize the dark pupil area.

Example 9 is directed to the display of example 8, further comprising a low refractive index medium having a plurality of electrophoretically mobile particles is disposed in the gap.

Example 10 is directed to the display of example 8, wherein the plurality of convex protrusions are positioned one of symmetrically or asymmetrically with respect to one another.

Example 11 is directed to the display of example 8, wherein the plurality of convex protrusions overlap.

Example 12 is directed to the display of example 8, wherein the plurality of convex protrusions have substantially the same shape.

Example 13 is directed to the display of example 8, wherein the plurality of convex protrusions have different shapes.

Example 14 is directed to the display of example 8, wherein a pair of adjacent protrusions are separated by a spacing (s) and wherein the distance between the pair of adjacent protrusions (p) such that s is a fraction of p.

Example 15 is directed to the display of example 8, wherein at least one convex protrusion is defined by a height (h) and a width (w) and wherein the ratio of the height to the width is in the range of about 0.3-0.7.

Example 16 is directed to the display of example 8, wherein at least one convex protrusion comprises a surface profile defined by the equation: Y(x)=0.123*cosh(3.1*x)−1.373.

Example 17 is directed to the display of example 8, wherein at least one convex protrusion comprises a surface profile defined by the equation: Y(x)=Y0+a2x2+a4x4+a6x6+a8x8; in which Y0, a1, a4, a6 and a8 are constants.

Example 18 is directed to the display of example 8, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which a1, k, C, a4, a6 and a8 are constants.

Example 19 is directed to a method to form a totally internally reflective (TIR) image display, the method comprising: forming a front assembly having a light guide, a front sheet, a front electrode and a plurality of convex protrusions, each of the plurality of convex protrusions having a respective dark pupil area, the front assembly forming a side edge; placing a light source to emit light through an edge of the light guide; placing a back assembly across the front assembly to form a gap with the front assembly, the back assembly having a back plane and a rear electrode; and disposing a medium in the gap, the medium including a plurality of electrophoretic particles movable to one of the front electrode or the rear electrode responsive to an applied bias; wherein at least one of the plurality of convex protrusions is configured to minimize the dark pupil area.

Example 20 is directed to the method of example 19, wherein the plurality of convex protrusions overlap.

Example 21 is directed to the method of example 19, wherein a pair of adjacent protrusions are separated by a spacing (s) and wherein the distance between the pair of adjacent protrusions (p) such that s is a fraction of p.

Example 22 is directed to the method of example 19, wherein at least one convex protrusion is defined by a height (h) and a width (w) and wherein the ratio of the height to the width is in the range of about 0.3-0.7.

Example 23 is directed to the method of example 19, wherein at least one convex protrusion comprises a surface profile defined by the equation: Y(x)=0.123*cosh(3.1*x)−1.373.

Example 24 is directed to the method of example 19, wherein at least one convex protrusion comprises a surface profile defined by the equation: Y(x)=Y0+a2x2+a4x4+a6x6+a8x8; in which Y0, a1, a4, a6 and a8 are constants.

Example 25 is directed to the method of example 19, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which $a_1$, k, C, $a_4$, $a_6$ and as are constants.

It will be apparent to those skilled in the technology of image displays that numerous changes and modifications can be made in the preferred embodiments of the invention described above without departing from scope of the invention. Accordingly, the foregoing description is to be construed in an illustrative and not in a limitative sense.

What is claimed is:

1. A totally internally reflective (TIR) image display, comprising:
    a front assembly having a light guide, a front sheet, a front electrode and a plurality of convex protrusions, each of the plurality of convex protrusions having a respective dark pupil area, the front assembly forming a side edge;
    a light source to emit light through an edge of the light guide;
    a back assembly forming a gap with the front assembly, the back assembly having a back plane and a rear electrode; and
    a medium disposed in the gap, the medium including a plurality of electrophoretic particles movable to one of the front electrode or the rear electrode responsive to an applied bias;
    wherein at least one of the plurality of convex protrusions is configured to minimize the dark pupil area,
    wherein each convex protrusion of the plurality of convex protrusions includes a first side and a second side, the first side being in contact with the front sheet and the second side comprises a surface profile defined by the equation: Y(x)=0.123*cosh(3.1*x)−1.373, in which x represents a width of a base of the convex protrusion,
    wherein the each convex protrusion of the plurality of convex protrusions is configured to totally internally reflect a ray of light entering the each convex protrusion from the first side,
    wherein a refractive index of the each convex protrusion is greater than 1.4.

2. The display of claim 1, wherein at least one convex protrusion is defined by a height (h) and a width (w) and wherein the ratio of the height to the width is in the range of about 0.3-0.7.

3. The display of claim 1, wherein at least one convex protrusion comprises a surface profile defined by the equation: $Y(x)=Y_0+a_2x^2+a_4x^4+a_6x^6+a_8x^8$; in which $Y_0$, $a_1$, $a_4$, $a_6$ and $a_8$ are constants.

4. The display of claim 1, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which $a_1$, k, C, $a_4$, $a_6$ and as are constants.

5. A totally internally reflective (TIR) image display, comprising:
a front assembly having a front sheet, a front electrode and a dielectric layer, the front electrode interposed between the front sheet and the dielectric layer, the front sheet further including a plurality of convex protrusions, each of the plurality of convex protrusions having a respective dark pupil area; and
a back assembly forming a gap with the front assembly, the back assembly having a back plane and a rear electrode, the rear electrode positioned opposite the dielectric layer;
wherein at least one of the plurality of convex protrusions is configured to minimize the dark pupil area,
wherein each convex protrusion of the plurality of convex protrusions includes a first side and a second side, the first side being in contact with the front sheet and the second side comprises a surface profile defined by the equation: $Y(x)=0.123*\cosh(3.1*x)-1.373$, in which x represents a width of a base of the convex protrusion,
wherein the each convex protrusion of the plurality of convex protrusions is configured to totally internally reflect a ray of light entering the each convex protrusion from the first side,
wherein a refractive index of the each convex protrusion is greater than 1.4.

6. The display of claim 5, further comprising a low refractive index medium having a plurality of electrophoretically mobile particles is disposed in the gap.

7. The display of claim 5, wherein the plurality of convex protrusions are positioned one of symmetrically or asymmetrically with respect to one another.

8. The display of claim 5, wherein the plurality of convex protrusions overlap.

9. The display of claim 5, wherein the plurality of convex protrusions have substantially the same shape.

10. The display of claim 5, wherein the plurality of convex protrusions have different shapes.

11. The display of claim 5, wherein at least one convex protrusion is defined by a height (h) and a width (w) and wherein the ratio of the height to the width is in the range of about 0.3-0.7.

12. The display of claim 5, wherein at least one convex protrusion comprises a surface profile defined by the equation: $Y(x)=Y_0+a_2x^2+a_4x^4+a_6x^6+a_8x^8$; in which $Y_0$, $a_1$, $a_4$, $a_6$ and ag are constants.

13. The display of claim 5, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which $a_1$, k, C, $a_4$, $a_6$ and as are constants.

14. A method to form a totally internally reflective (TIR) image display, the method comprising:
forming a front assembly having a light guide, a front sheet, a front electrode and a plurality of convex protrusions, each of the plurality of convex protrusions having a respective dark pupil area, the front assembly forming a side edge;
placing a light source to emit light through an edge of the light guide;
placing a back assembly across the front assembly to form a gap with the front assembly, the back assembly having a back plane and a rear electrode; and
disposing a medium in the gap, the medium including a plurality of electrophoretic particles movable to one of the front electrode or the rear electrode responsive to an applied bias;
wherein at least one of the plurality of convex protrusions is shaped to minimize the dark pupil area,
wherein each convex protrusion of the plurality of convex protrusions includes a first side and a second side, the first side being in contact with the front sheet and the second side comprises a surface profile defined by the equation: $Y(x)=0.123*\cosh(3.1*x)-1.373$, in which x represents a width of a base of the convex protrusion,
wherein the each convex protrusion of the plurality of convex protrusions is configured to totally internally reflect a ray of light entering the each convex protrusion from the first side,
wherein a refractive index of the each convex protrusion is greater than 1.4.

15. The method of claim 14, wherein the plurality of convex protrusions overlap.

16. The method of claim 14, wherein a pair of adjacent protrusions are separated by a spacing(s) and wherein the distance between the pair of adjacent protrusions (p) such that s is a fraction of p.

17. The method of claim 14, wherein at least one convex protrusion is defined by a height (h) and a width (w) and wherein the ratio of the height to the width is in the range of about 0.3-0.7.

18. The method of claim 14, wherein at least one convex protrusion comprises a surface profile defined by the equation: $Y(x)=0.123*\cosh(3.1*x)-1.373$, in which x represents a width of a base of the convex protrusion.

19. The method of claim 14, wherein at least one convex protrusion comprises a surface profile defined by the equation: $Y(x)=Y_0+a_2x^2+a_4x^4+a_6x^6+a_8x^8$; in which $Y_0$, $a_1$, $a_4$, $a_6$ and ag are constants.

20. The method of claim 14, wherein at least one convex protrusion comprises a surface profile defined by the equation $$Y(x) = \frac{Cx^2}{1+\sqrt{1-(1+k)C^2x^2}} + a_2x^2 + a_4x^4 + a_6x^6 + Y_0$$

in which $a_1$, k, C, $a_4$, $a_6$ and as are constants.

* * * * *